United States Patent [19]

Reach et al.

[11] 4,309,761

[45] Jan. 5, 1982

[54] CALCULATOR FOR EVALUATING NUMERICAL ANSWERS TO PROBLEMS

[75] Inventors: Roy W. Reach, Sudbury; William M. Kahn, Brighton; David Shapiro, Lincoln, all of Mass.

[73] Assignee: Hewlett-Packard Company, Palo Alto, Calif.

[21] Appl. No.: 60,950

[22] Filed: Jul. 26, 1979

Related U.S. Application Data

[60] Division of Ser. No. 731,611, Oct. 31, 1976, Pat. No. 4,198,684, which is a division of Ser. No. 390,645, Aug. 22, 1973, Pat. No. 3,996,562, which is a continuation of Ser. No. 378,221, Jun. 26, 1964, abandoned.

[51] Int. Cl.[3] .......................................... G06F 3/023
[52] U.S. Cl. .................................................... 364/900
[58] Field of Search ... 364/200 MS File, 900 MS File, 364/715, 751, 752

[56] References Cited

U.S. PATENT DOCUMENTS

| | | | |
|---|---|---|---|
| 2,902,217 | 9/1959 | Davis | 364/200 |
| 2,982,472 | 5/1961 | Huskey | 364/200 |
| 3,047,228 | 7/1962 | Bauer et al. | 364/200 |
| 3,166,668 | 1/1965 | Marsh | 364/200 |
| 3,293,616 | 12/1966 | Mullery et al. | 364/200 |
| 3,328,763 | 6/1967 | Rathbun et al. | 364/200 |
| 3,330,946 | 7/1967 | Sciutto | 364/751 |
| 3,402,285 | 9/1968 | Wang | 364/715 |

*Primary Examiner*—Harvey E. Springborn
*Attorney, Agent, or Firm*—Roland I. Griffin

[57] ABSTRACT

A programmable electronic calculator for numerical evaluation of mathematical problems operates through the application of one or more basic mathematical operators, properly grouped, to each input numerical operand of a mathematical problem according to the accepted rules of mathematical combinations. One may select any numerical operand, any of the four basic arithmetic operators, left parenthesis and right parenthesis to denote groupings, a storage register for receiving a numerical operand to be used in computation or a numerical operand representing a result of a partial or final computation, or a storage register whose contents it is desired to print. Entry of each numerical operand and mathematical operator is accompanied by a printed record of that numerical operand and that mathematical operator so that the mathematical problem may be continually monitored as it is being entered. Depression of an equals key is followed by evaluation of previously designated operations and printing of the result. Selection of a left (or opening) parenthesis causes the contents of first and second accumulator registers in an arithmetic unit to shift to third and fourth accumulator registers in the arithmetic unit respectively. Selection of a right (or closing) parenthesis causes the shifting and combining of previously stored numerical operands to produce the result of the arithmetic combination embraced within a sequence denoted by a mating left parenthesis. One may select a learn mode in which steps are entered in a learn memory by working out a mathematical problem, each selected operation corresponding to a step in the learn memory. Thereafter, one may select an automatic computation mode to cause the operations previously stored in the learn memory to be carried out in sequence until a desired result is obtained or a predetermined point in the program stored in learn memory is reached.

7 Claims, 32 Drawing Figures

KEYBOARD OPERATIONS EXECUTION — CHART I

| OPERATION CODE IN C1-4 FROM KEYBOARD (OR CS REGISTER) | STEP 1 | STEP 2 | STEP 3 | STEP 4 | STEP 5 |
|---|---|---|---|---|---|
| X | ARITHMETICALLY COMBINE THE CONTENTS OF R1 WITH THE CONTENTS OF THE BUFFER IN ACCORDANCE WITH THE CODE STORED IN R1 AS SHOWN IN CHART 2, PUT IDENTITY IN BUFFER, AND PUT X CODE IN R1 | PUT X CODE IN R1 | NONE | NONE | NONE |
| ÷ | | PUT ÷ CODE IN R1 | NONE | NONE | NONE |
| + | | SHIFT $R_1 \to$ BUFFER $R_2 \to R_1$ $R_3 \to R_2$ $R_4 \to R_3$ $I \to R_4$ | ARITHMETICALLY COMBINE THE CONTENTS OF R1 WITH THE CONTENTS OF THE BUFFER IN ACCORDANCE WITH THE CODE IN R1 AS SHOWN IN CHART 2, AND PUT X CODE IN R1 | PUT + CODE IN R1 | SHIFT $R_3 \to R_4$ $R_2 \to R_3$ $R_1 \to R_2$ BUFFER $\to R_1$ IDENTITY $\to$ BUFFER |
| − | | | | PUT − CODE IN R1 | |
| ) | | | | SHIFT AS IN STEP 2 | ARITHMETICALLY COMBINE R1 AND BUFFER AS IN STEP 3 |
| ( IF BUFFER REGISTER HAS A NUMBER OR THE STORED CODE IN R1 IS NOT ÷ | | PUT X CODE IN R1 | SHIFT $R_3 \to R_4$ $R_2 \to R_3$ $R_1 \to R_2$ BUFFER $\to R_1$ IDENTITY $\to$ BUFFER | SHIFT $R_3 \to R_4$ $R_2 \to R_3$ $R_1 \to R_2$ BUFFER $\to R_1$ IDENTITY $\to$ BUFFER | NONE |
| = OR ⊖ | | SHIFT $R_1 \to$ BUFFER $R_2 \to R_1$ $R_3 \to R_2$ $R_4 \to R_3$ IDENTITY $\to R_4$ | ARITHMETICALLY COMBINE BUFFER AND R1 AS IN STEP 1 | SHIFT $R_1 \to$ BUFFER $R_2 \to R_1$ $R_3 \to R_2$ $R_4 \to R_3$ IDENTITY $\to R_4$ | IF R1 IS AN IDENTITY, END PROCESS; IF NOT, REPEAT STEPS 3, 4, & 5 |
| ( BUFFER REGISTER HAS NO NUMBER AND THE STORED CODE IN R1 IS ÷ | SHIFT $R_3 \to R_4$ $R_2 \to R_3$ $R_1 \to R_2$ BUFFER $\to R_1$ IDENTITY $\to$ BUFFER | SHIFT $R_3 \to R_4$ $R_2 \to R_3$ $R_1 \to R_2$ BUFFER $\to R_1$ IDENTITY $\to$ BUFFER | NONE | NONE | NONE |

ARITHMETIC OPERATIONS — CHART 2

| REGISTER CONTENTS BEFORE OPERATION | | | | REGISTER CONTENTS AFTER OPERATION | |
|---|---|---|---|---|---|
| R1 | | BUFFER | BUFFER | R1 | |
| NUMERIC VALUE | OPERATION CODE | | | NUMERIC VALUE | OPERATION CODE |
| N1−NUMBER (1) | + | NUMBER (2) − N2 | IDENTITY | N1 + N2 | CODES AS ASSIGNED IN CHART I |
| N1−NUMBER (1) | − | NUMBER (2) − N2 | IDENTITY | N1 − N2 | |
| N1−NUMBER (1) | X | NUMBER (2) − N2 | IDENTITY | N1 X N2 | |
| N1−NUMBER (1) | ÷ | NUMBER (2) − N2 | IDENTITY | N1 ÷ N2 | |
| IDENTITY | ANY CODE | NUMBER (2) − N2 | IDENTITY | N2 | |
| N1−NUMBER (1) | ANY CODE | IDENTITY | IDENTITY | N1 | |
| IDENTITY | ANY CODE | IDENTITY | IDENTITY | IDENTITY | |

IDENTITY IS A BLANK NUMBER: THE BUFFER HAS AN IDENTITY IF NO ENTRY IS MADE TO IT FROM THE KEYBOARD. THE START-UP PROCEDURE OF "(" "(" "=" LEAVES IDENTITY IN THE BUFFER & ACCUMULATOR REGISTERS

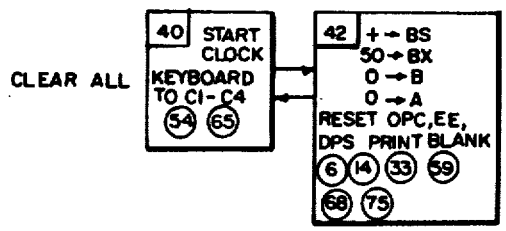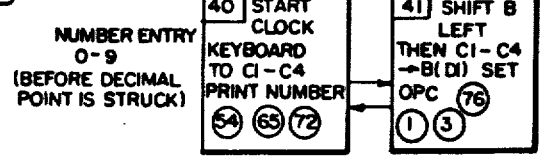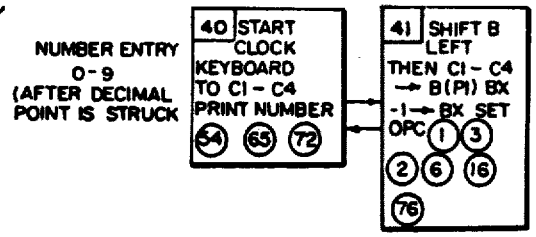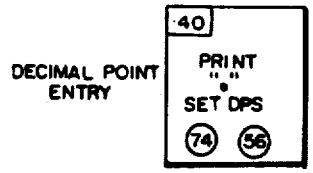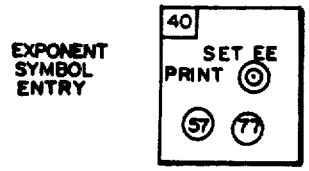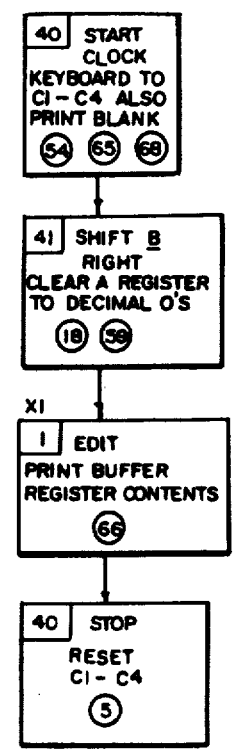

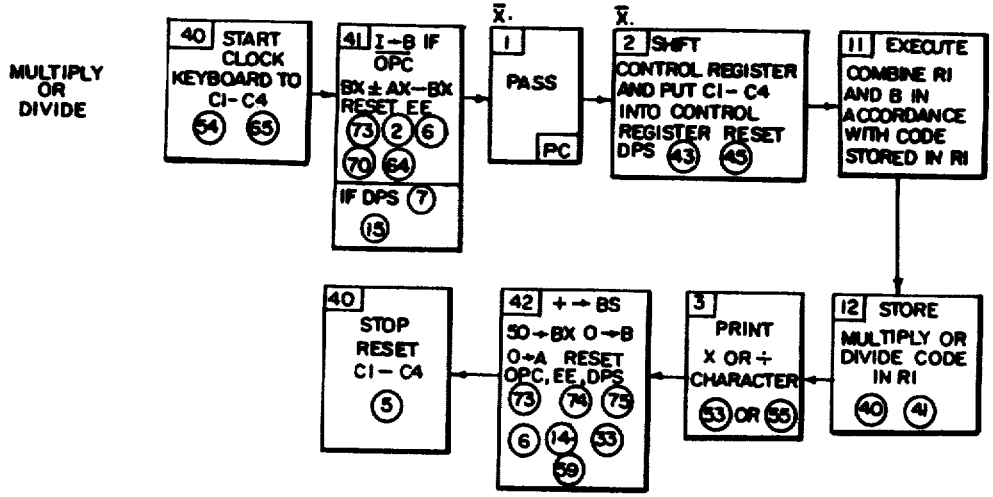
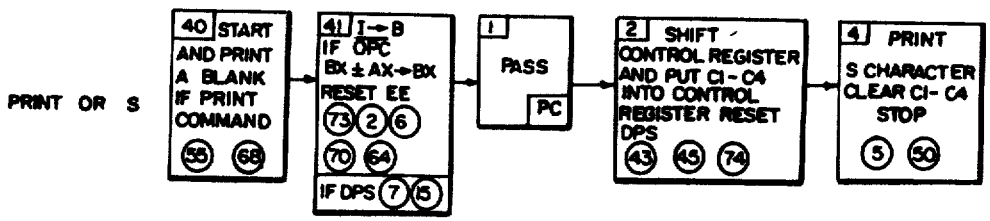
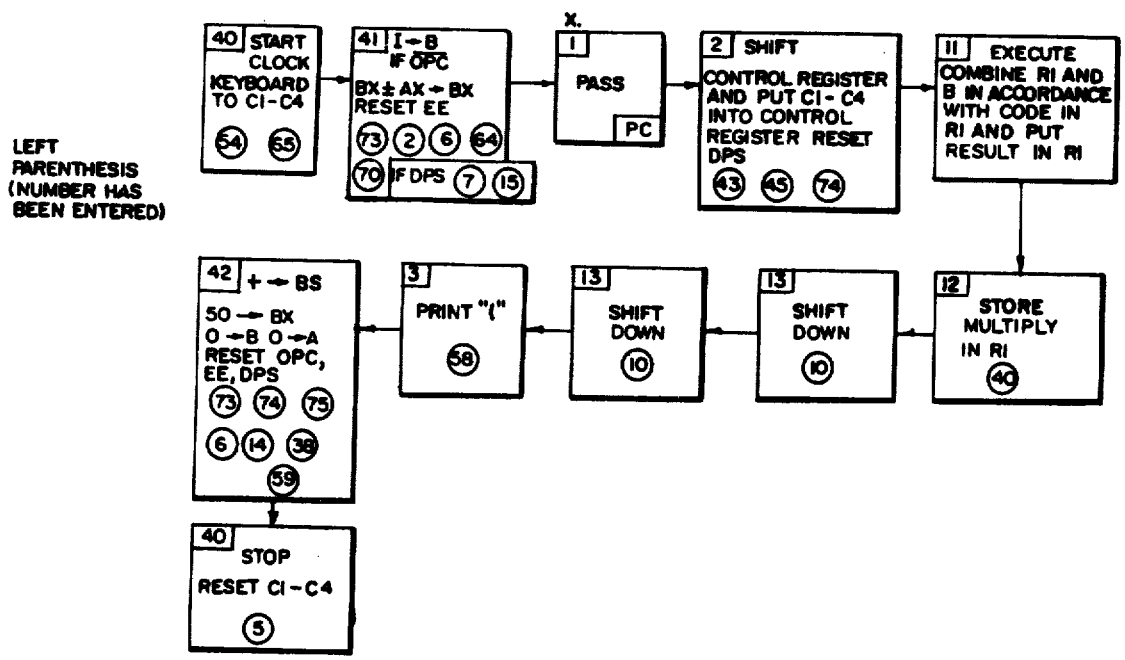

| OP | LAST CYCLE |
|---|---|
| ( | CY 13 |
| ) | CY 13 |
| + | CY 13 |
| − | CY 13 |
| × | CY 12 |
| ÷ | CY 12 |
| NUM. AFTER ● | CY 5 |
| NUM. AFTER S | CY 5 |
| NUM. AFTER PRINT | CY 1 |
| = | DO NOT RETURN TO CY2 STOP |

EOF — EXPONENT OVERFLOW
BFS — BUFFER REGISTER HAS 2 NON-ZERO CHARACTERS IN HIGH ORDER
PRC — PRINTING IS COMPLETE
 * SET ALL ONES IN A REGISTER

FIG.11

CALCULATOR FOR EVALUATING NUMERICAL ANSWERS TO PROBLEMS

CROSS REFERENCE TO RELATED APPLICATIONS

This is a divisional of U.S. patent application Ser. No. 731,611 filed on Oct. 13, 1976 (now U.S. Pat. No. 4,198,684), which is a divisional of U.S. patent application Ser. No. 390,645 filed on Aug. 22, 1973 (now U.S. Pat. No. 3,996,562), which is in turn a continuation of U.S. patent application Ser. No. 378,221 filed on June 26, 1964 (now abandoned).

The present invention relates in general to functional analysis and more particularly concerns apparatus and techniques for automatically evaluating numerical answers to problems presented in the form of automatic or keyboard generated input signals by applying internal automatic sequencing, using stored iterative or one-shot, programming and providing the results of the numerical evaluation in the form of electrical output signals that may actuate an integral printer or otherwise be used by external utilization apparatus. A commercial embodiment of the invention offers the computing power and flexibility of stored program automatic digital computation in a physical system small enough to be portable, low enough in cost to be within the means of small institutions, and so simple to operate (with the identification of the relatively small number of controls on the keyboard being in terms familiar to most operators) that a minimal amount of instruction time is required for anyone with a numerical problem to operate the apparatus himself without the costly time-consuming aid of a specialized programmer. A feature of this commercial embodiment resides in immediately displaying each operation in readily recognizable form to the operator as each operation is performed to provide the operator with a permanent record of the problem and its solution.

Numeric evaluation of mathematical functions involves the application of basic mathematical operators, properly grouped, to each input operand in the function according to the accepted rules of methematical combinations, including the associative and commutative laws. By evaluating the summation of series, applying iterative processes, evaluating polynomial approximations and effecting other mathematical operations, the basic mathematical operations may be appropriately combined to evaluate more complex transcendental functions. It need hardly be stated that the final result must be both numerically correct in terms of digit accuracy and magnitude.

Probably the most conventional approach to obtaining numeric evaluations is through manual techniques, often supplemented by charts and tables. Here the individual generates the problem manually and combines the numerical operands in proper sequences by applying his own knowledge of the rules and laws of mathematics. Mechanical calculators may reduce the burden on the individual of computing simple products, sums, differences and quotients. Some of these mechanical calculators can perform simple combinations, but these combinations do not always adhere to the associative and commutative laws. For example, a typical mechanical calculator would give you the correct answer to the problem $2 \times 3 + 5$ as 11 but would incorrectly indicate the answer to $5 + 2 \times 3$ as being 21. Furthermore prior art mechanical calculators do not necessarily place the decimal point where it belongs. Thus, despite these mechanical aids, the operator still must apply the mathematical laws in the proper sequence, remember the intermediate results, locate the decimal point properly and physically repeat each iteration or repetition required when evaluating transcendental functions. Moreover, when prior art calculators do provide a printed output, it occurs relatively slowly and sometimes with relatively low accuracy.

A large general purpose digital computer arithmetic unit does have the fundamental ability to add, subtract, multiply and, usually, but not always, divide, but with quite limited ability to combine these operations automatically. It is true that equipment external to the arithmetic unit of a general purpose computer, including an extensive memory and means for applying a detailed stored program, enables a general purpose computer to perform all desired operations for numeric solution, including the evaluation of transcendental functions. However, these computers are so costly and the preparation time for introducing a problem into the computer so great that it is impractical for most people with numerical problems to employ a large general purpose computer. While attempts have been made to achieve more flexible numerical evaluation at lower cost, these attempts have still been characterized by serious economic and technical disadvantages.

Accordingly, it is an important object of this invention to provide methods and means for solving mathematical problems while automatically adhering to all rules of mathematical computation, including the associative and commutative laws, with relatively little storage and while avoiding the application of complex stored programs.

It is another object of this invention to achieve the preceding object while processing data that is presented in convenient mathematical input form familiar to most people having relatively elementary mathematical backgrounds.

It is another object of this invention to achieve the preceding objects with methods and means for automatically locating the proper position of the decimal point.

It is another object of this invention to achieve the preceding objects with relatively little storage apparatus that nevertheless adequately retains intermediate results to the extent and for the duration necessary to achieve a desired final result.

It is another object of this invention to convert digital numbers of prescribed radix into an easy-to-read form suitable for printing with decimal points properly indicated and identification of the proper positive or negative exponent of that radix multiplier identified. More specifically, it is an object of this invention to accurately indicate the absolute magnitude of decimal numbers by a sequence of decimal digits with the decimal point properly placed accompanied by a multiplier which is an exponent of 10 of proper sign.

It is another object of this invention to provide methods and means for easily generating and storing a complex sequence of steps for automatically combining automatically generated numerical evaluations in iterative, series or other multiple step evaluations to automatically evaluate transcendental functions and other complex equations, such as extracting roots and evaluating trigonometric functions.

It is another object of this invention to provide economical means relatively free from complexity for automatically manipulating numbers identified by a sequence of digits, a decimal point and a power of the digital number radix exponent as a multiplier.

It is another object of this invention to achieve the preceding objects by establishing a sequence of control states through the use of relatively little but highly reliable apparatus which is relatively low in cost.

It is another object of this invention to select the contents of a specific storage register with information for a selected operation through methods and means relatively free from complexity and relatively low in cost.

It is still another object of the invention to achieve the preceding objects in a relatively compact physical package including a keyboard and/or means for receiving external electrical input to provide a proper automatic numerical evaluation of mathematical functions by simply entering the equation in serial sequence in precise accepted mathematical notation, which may include parentheses, decimal points, signs, and basic operators, to obtain not only an immediately printed answer within a fraction of a second with the decimal point properly located, but also the sequence of elements in the problem preceding the solution.

According to the invention, means are provided to encode numbers and mathematical operators entered into the calculator and to temporarily store this encoded data in a logic unit. The logic unit puts the numbers into a more permanent storage, the memory unit. Means responsive to reception of enough input data to perform a partial computation effects such partial computation, automatically extracting from the memory unit any stored number needed in the execution of the partial computation. The logic unit includes means for redirecting the partial result so obtained back into the memory unit upon completion of the partial computation. The logic unit also include means for providing a printed record of any number of operator selected by the keyboard or otherwise presented input signals for encoding and processing. The logic unit also includes means for computing the final result upon receipt of a signal that all data and operators have been entered, and means for editing the final result to provide a signal suitable for effecting proper print-out presentation. In a preferred form of printer, the printer prints a complete record of the on-line equation as each element is entered and the result computed in standard equation form, which printed record is suitable for direct use in reports, by auditors, or in laboratory notebooks.

A preferred commercial embodiment of the invention also includes means for store numbers and results that might be used repetitively in response to keyboard control for subsequent recall under keyboard control. Means are also provided for producing a printed result in on-line equation form when using such keyboard controlled storage.

Means are provided for generating codes under selectively actuated program mode control to store a program of steps designated by depressing the keys of the keyboard in a sequential manner and to automatically recall and cause to be repeated in a repetitious manner the sequence of selected steps. Means are also provided for stopping the repetition in response to a computation process which produces a numerical value that exceeds a prescribed limit. When operating under control of the stored program, means are provided for limiting the printed out results to those programmed. Means are also provided for generating a single code in response to a numeric operand being entered in a sequence for which a coded program is being simultaneously generated and to cause processing of the programto halt and thereafter resume in response to entry of a manually keyed number.

Numerous other features, objects and advantages of the invention will become apparent from the following specification when read in connection with the accompanying drawings in which:

FIG. 3 illustrates the format of register words in a commercial embodiment of the invention and of numeric and operational codes;

FIG. 4 shows charts of the keyboard operations execution and of the arithmetic operations;

Figure 8G:
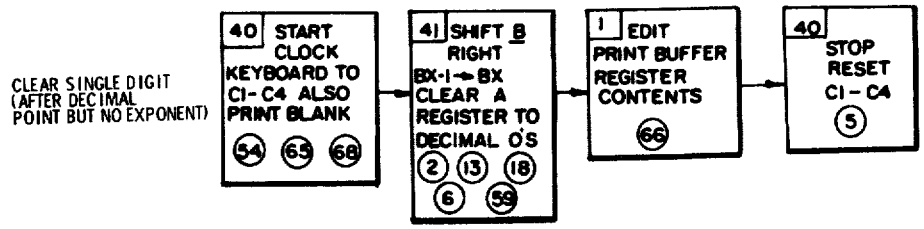
Figure 8H:
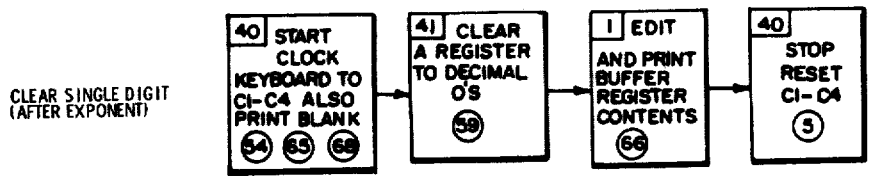
Figure 8I:
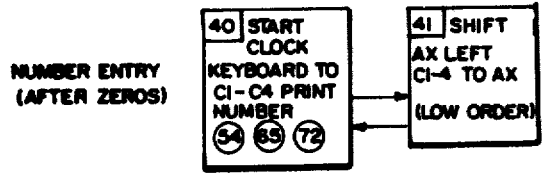
Figure 8J:
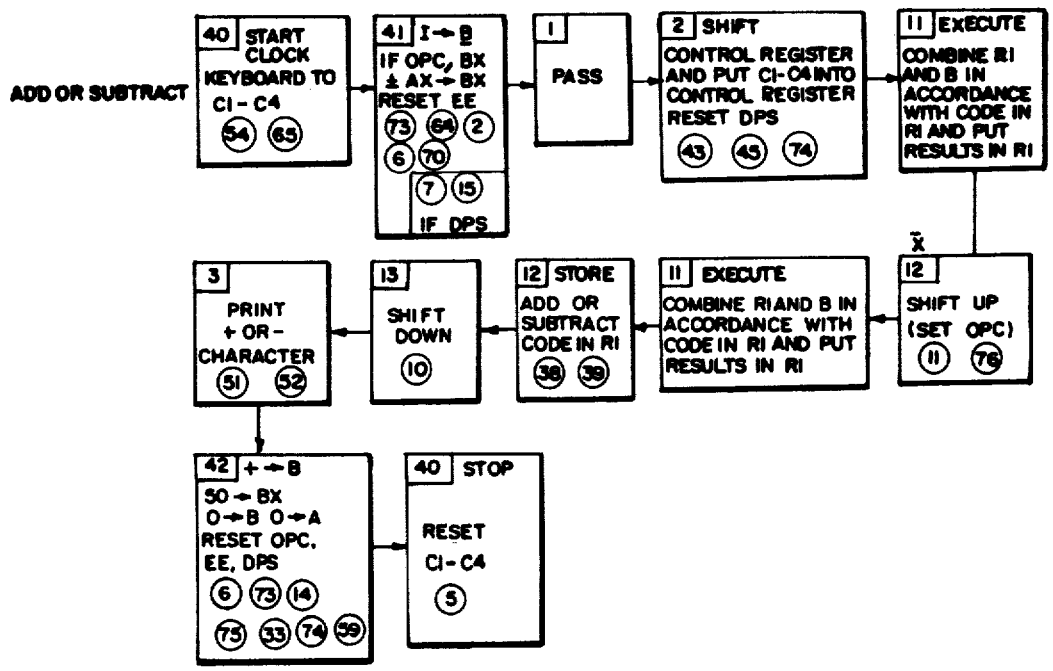
Figure 8N:
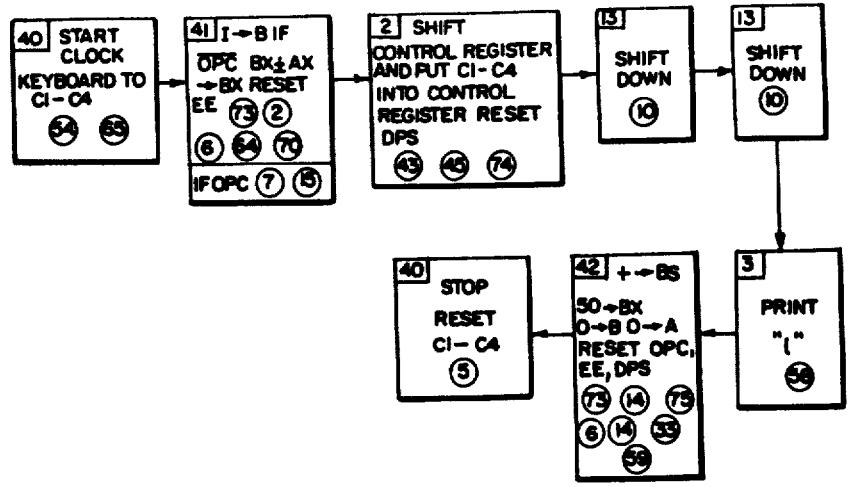
Figure 8O:
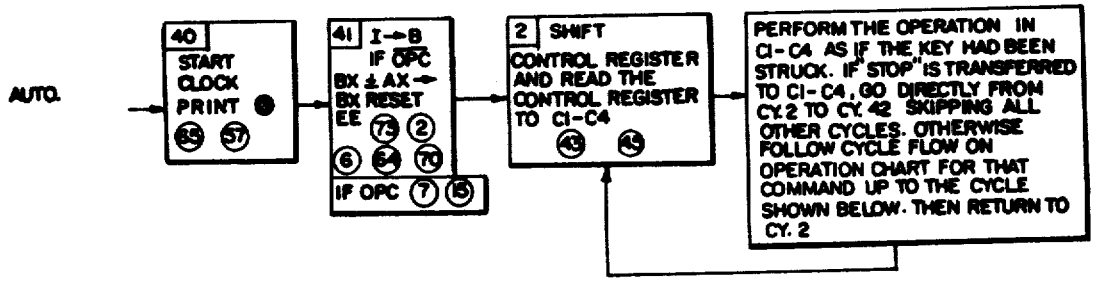
Figure 8P:
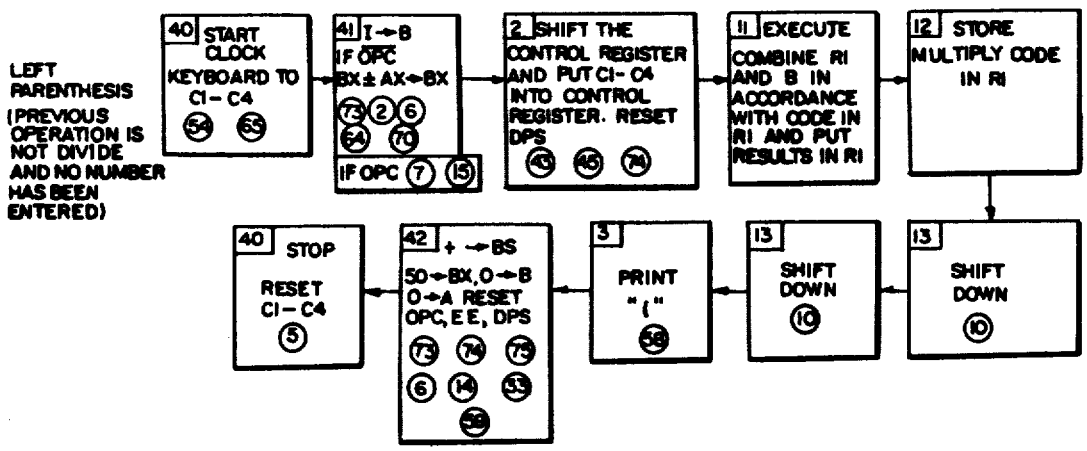
Figure 8Q:
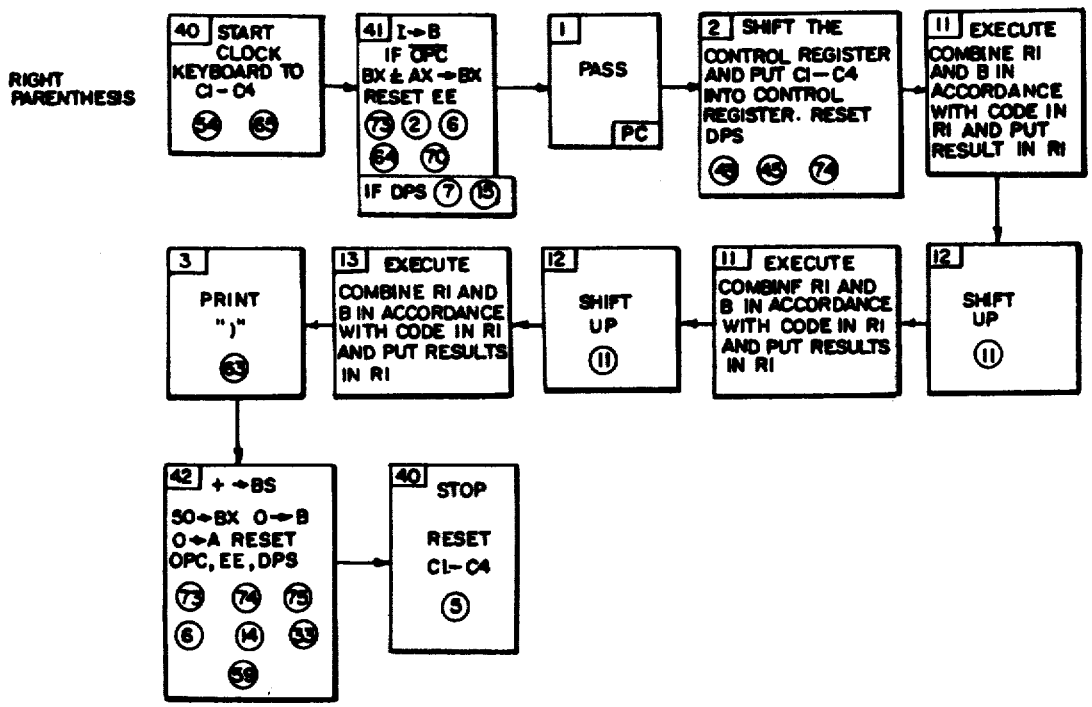
Figure 8R:
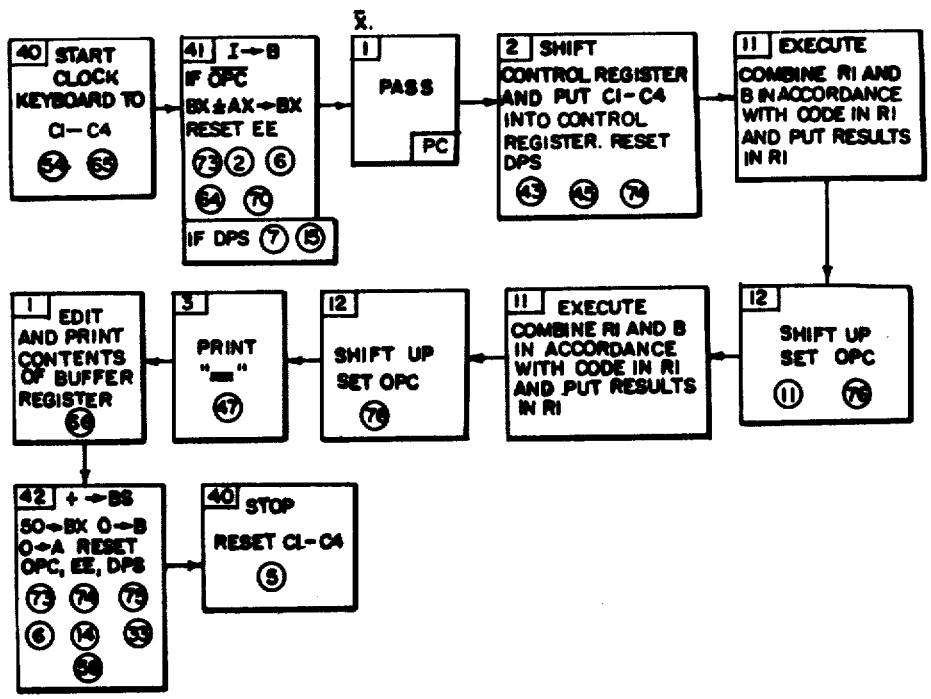
Figure 8S:
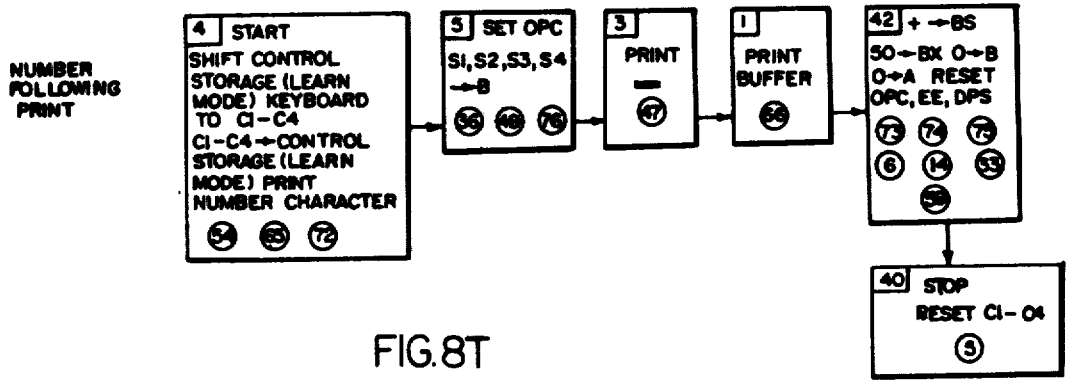
Figure 8T:
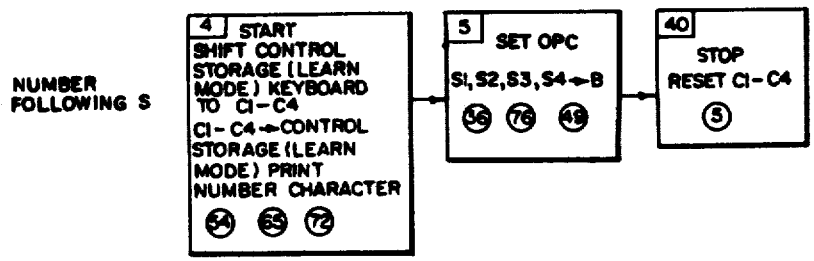
Figure 8U:
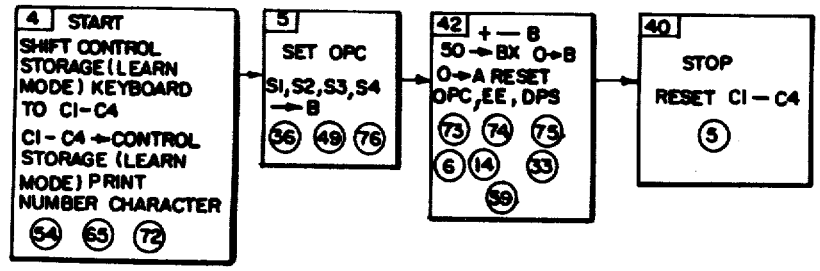
Figure 8V:
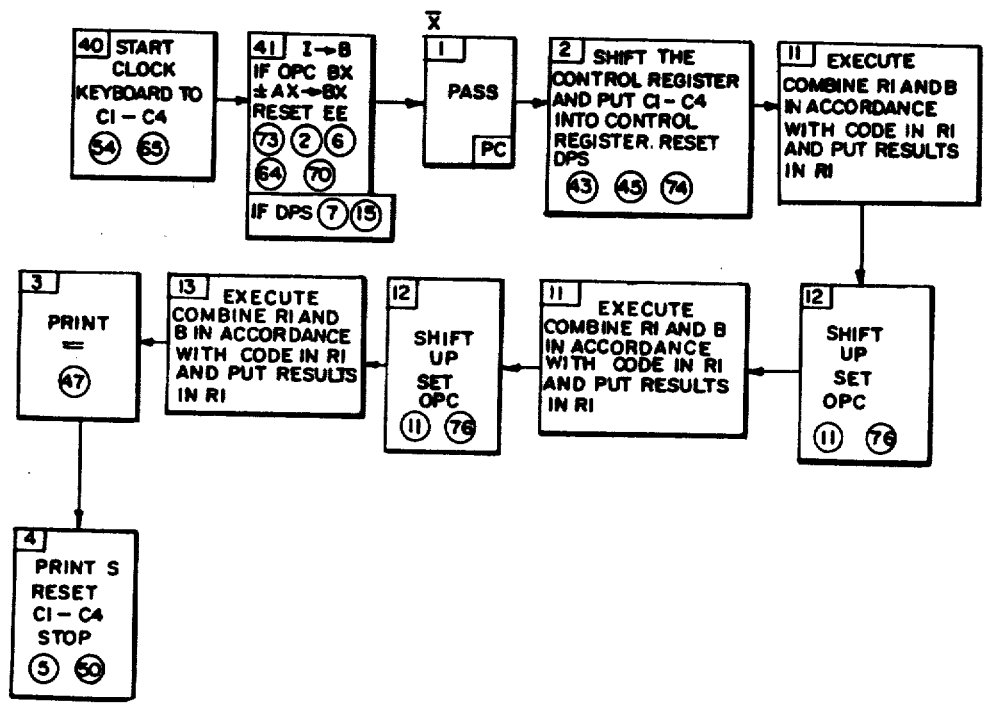
Figure 9:
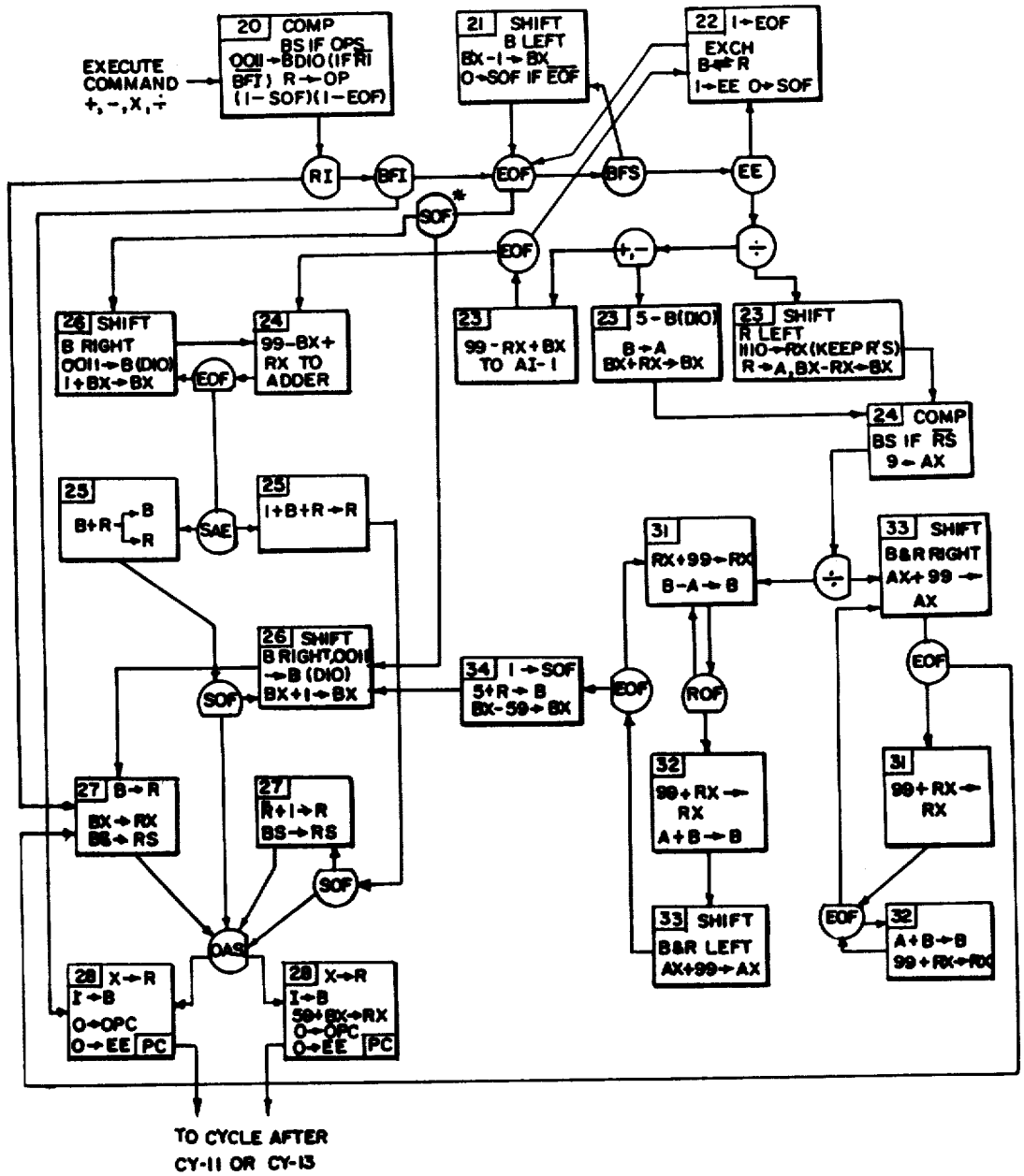
Figure 10:
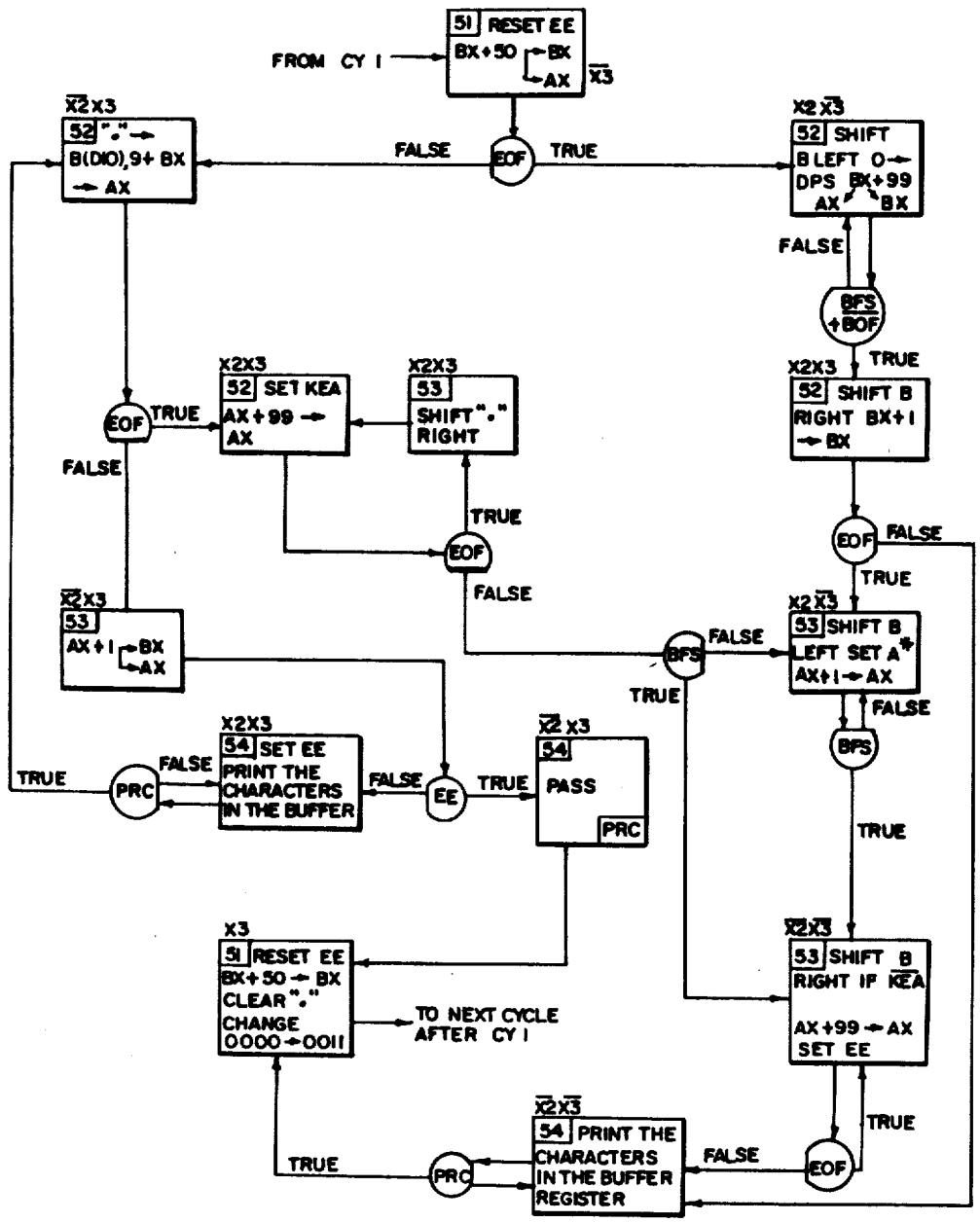

FIGS. 8A–8V are flow diagrams showing the order of steps carried out in the operations CLEAR ALL, NUMBER ENTRY 0–9 (BEFORE DECIMAL POINT IS STRUCK), NUMBER ENTRY 0–9 (AFTER DECIMAL POINT IS STRUCK), DECIMAL POINT ENTRY, EXPONENT SYMBOL ENTRY, CLEAR SINGLE DIGIT (BEFORE DECIMAL POINT OR EXPONENT), CLEAR SINGLE DIGIT (AFTER DECIMAL POINT BUT NO EXPONENT), CLEAR SINGLE DIGIT (AFTER EXPONENT), NUMBER ENTRY (AFTER ZEROS), ADD OR SUBTRACT, MULTIPLY OR DIVIDE, PRINT OR S, LEFT PARENTHESIS (NUMBER HAS BEEN ENTERED), LEFT PARENTHESIS (PREVIOUS OPERATION IS DIVIDE AND NO NUMBER HAS BEEN ENTERED), AUTO, LEFT PARENTHESIS (PREVIOUS OPERATION IS NOT DIVIDE AND NO NUMBER HAS BEEN ENTERED), RIGHT PARENTHESIS=, NUMBER FOLLOWING PRINT, NUMBER FOLLOWING S, NUMBER FOLLOWING S, AND S, RESPECTIVELY;

FIG. 9 is a flow diagram showing the order of steps carried out during execute cycles;

FIG. 10 is a flow diagram showing the order of steps carried out during print edit cycles; and FIG. 11 is a timing diagram illustrating the sequence of occurrences during the print cycle when the buffer register contents are printed.

Figure 1:
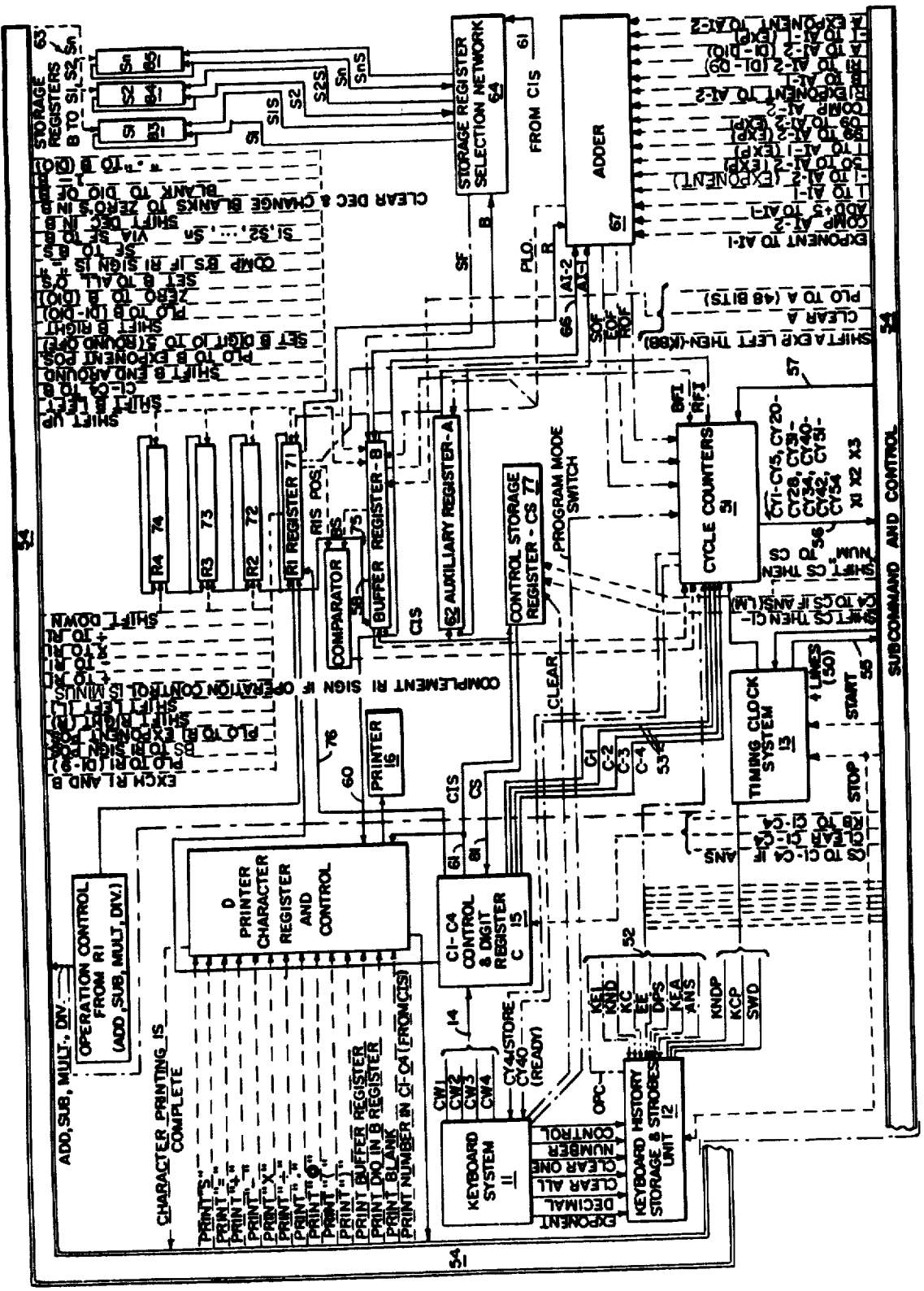
FIG. 1 is a block diagram illustrating the logical arrangement of an analyzer according to the invention.

With reference now to the drawing and more particularly FIG. 1 thereof, there is shown a block diagram illustrating the logical arrangement of an analyzer according to one embodiment of the invention. Since specific components for assembling the analyzer are well-known in the art, detailed discussion thereof has been omitted to avoid obscuring the principles of the invention. Actuation of a key of the keyboard system 11 closes an electrical contact for routing an appropriate control signal through the special keyboard history storage and strobes unit 12 to the timing clock system 13 and stores a four-bit code over the four parallel lines 14 in control and digit register 15 to identify the number or operand designated by the depressed key.

Figure 2:
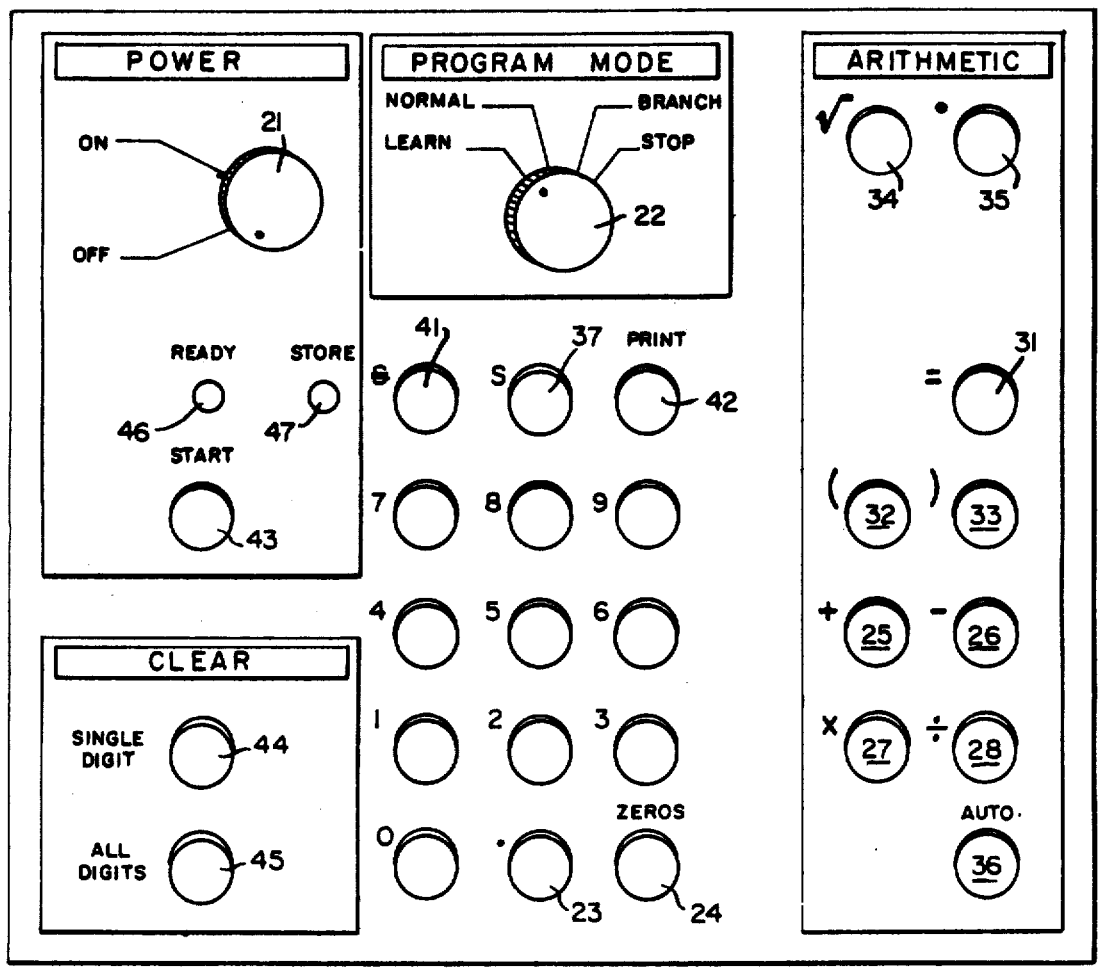
FIG. 2 is a perspective view of the control keyboard in a commercial embodiment of the invention.

Referring to FIG. 2, there is shown a perspective view of a control panel of the keyboard system 11. The following explanation of the functions of the different keys and switches will facilitate understanding the operation and arrangement of the analyzer of FIG. 1. The analyzer is energized by turning the power switch 21 into the "on" position. The program mode switch 22 selects one of the four program modes LEARN, NORMAL, BRANCH and STOP.

In the NORMAL position as shown the analyzer may function as a calculator to effect arithmetic combinations of decimal numbers. These numbers comprise decimal digits selected in sequence by depressing appropriate ones of the ten numeric keys designated 0-9. Depressing the decimal point key 23 between the selection of consecutive digits locates the decimal point between those digits. An appropriate power of 10 multiplier is selected by first depressing the ZEROS key 24, and then depressing respective ones of the numeric keys 0-9 to specify the number of zeros. Successive numbers are arithmetically combined by depressing one of the add key 25, the subtract key 26, the multiply key 27 or the divide key 28. Any number of decimal numbers may be joined by an appropriate mathematical operator, and each decimal number and the connecting operators are simultaneously printed out by the printer 16 so that one using the analyzer can see the progress of the operations thus far selected. Upon pressing the EQUALS key 31, the analyzer combines the numbers thus far selected in accordance with the selected arithmetical operations to print out the equal sign and the result of such arithmetical combination in accordance with the mathematical associative and commutative laws.

In addition to the normal arithmetical operations, the invention provides the feature of parenthecation. By first depressing the left parenthesis key 32, selecting a combination of decimal numbers and then depressing the right parenthesis key 33, the analyzer will automatically treat the material in the parentheses as a single decimal number to the combination of numbers inside the parentheses processed in accordance with the mathematical laws designated by the enclosed operators while continuing to print each parenthesis, decimal number and operator selected. A decimal number immediately adjacent to a parenthesis is treated as a coefficient of the parenthecated material.

Moving the program mode switch 22 into the LEARN position prepares the analyzer for receiving instructions for carrying out a prescribed program automatically. This program may be implemented after it is inserted by turning the program mode switch to the NORMAL position and depressing the AUTO key 36. The instructions may be inserted by working each step of the problem while the program mode switch 22 is in the learn mode. A decimal number may be stored by first designating the number as described above, by then depressing the EQUALS STORE key 41, and finally by depressing an appropriate one of the numeric keys to identify the particular storage register where the selected decimal number is to be stored. The next step in the program might then be an operation involving what is stored in that storage register arithmetically combined with something that has previously been stored in another register with instructions to print out the result or to store the result in a designated storage. To select a number then stored in a storage register for such arithmetic combination, it is only necessary to press the STORE key 37 followed by the appropriate one of the numeric keys identifying that storage register. If it is desired to store the result of that combination in a designated storage register, first the EQUALS STORE key 41 is depressed, and then the numeric key identifying that designated storage register is depressed. If it is desired to print out the contents of a particular register, PRINT key 42 is depressed followed by depression of the appropriate one of the numeric keys. The mechanical steps followed by the operator will be better understood from the discussion of a specific example set forth in detail below.

By moving the program made switch 22 to the BRANCH position, then depressing AUTO key 36, the analyzer will operate automatically and stop at the end of a sequence of designated program steps if and only if the result of the last arithmetic computation was either zero or positive. By moving the program mode switch 22 to the STOP position and depressing the AUTO key 36, each step in a selected program is carried out and automatic operation stopped at the completion of the last step, regardless of the result of the last arithmetic computation.

The steps in the program for evaluating the square root of a number by Newton's method of successive approximations are immediately inserted into the analyzer by depressing the SQUARE ROOT key 34 with the program mode switch 22 in any of the NORMAL, BRANCH, or STOP positions. Then with the program mode switch 22 in the BRANCH position, the number to be square rooted is entered by depressing the numeric keys. Pressng EQUALS STORE key 41 and the number 1 key transfers the number to be square rooted into a first storage register S1. Depressing AUTO key 36 causes the analyzer to compute the square root of the number, place the square root in a third storage register S3 and print out the result.

Key 35 may also be employed to select the steps in a predetermined program for insertion into the analyzer. For example, depressing key 35 might select the program for cube rooting.

Depression of the START key 43 functions to reset various control states preparatory to starting a problem immediately after power switch 21 has been turned to the "on" position.

Depression of the CLEAR SINGLE DIGIT key 44 functions to clear the last digit entered in the buffer register 58 (FIG. 1) and print the contents of that register after such last digit is cleared.

Depression of the CLEAR ALL DIGITS key 45 functions to clear the entire buffer register.

When READY light 46 is illuminated, the analyzer is in condition for receiving input data. This light is extinguished when the analyzer is computing or when STORE light 47 is lit.

When any one of EQUALS STORE key 41, STORE key 37 or PRINT key 42 is depressed, STORE light 47 is lit to indicate that the next designation must be a numeric identifying one of the storage registers. When the numeric key is depressed, the STORE light is extinguished.

The specific components of an analyzer according to the invention may comprise flip-flops, gates, buffers, shift registers, and other well-known elements of a computing system. To avoid obscuring the principles of the invention, a detailed description of each element and each interconnection is not set forth herein. The detailed description of the various command, control and data signals, together with the detailed flow diagrams and specific examples, best illustrates the principles and practice of the invention to those skilled in the computer art. The analyzer specifically described herein corresponds substantially to a commercially available computer now in use in governmental and private organizations in the United States.

In the discussion which follows and in the various flow diagrams and tables setting forth in detail the steps in the various processes, the use of abbreviations facilitates the description. The following glossary defines most of these abbreviations.

GLOSSARY OF TERMS

| | |
|---|---|
| A | Auxiliary Register 62 or its Contents |
| AI-1 | Adder Input 1 |
| AI-2 | Adder Input 2 |
| ANS | Automatic Mode Flip-Flop |
| AX | Exponent Position of "A" Register 62 |
| B | Buffer Register 58 or its Contents |
| BS | Buffer Register Sign Position |
| BX | Buffer Register Exponent Position |
| C or C1-C4 | Keyboard Control and Digit Storage Register 15 |
| CIS | Serial Output of C |
| CS | The 96-Bit 24 Character Serial Storage Register of Control Codes 77 or its Contents |
| D | Print Character Register |
| DPS | Exponent Entered Flip-Flop that Is Set when Depressed |
| EE | Stored Control State that the Exponent Key 24 Has Been Depressed |
| I | Identity Code Stored in a Register |
| KC | Control Key Flip-Flop |
| KND | Digit Key Flip-Flop |
| LM | Program Mode Switch 22 Is in the "Learn Mode " |
| RFI | R1 Register 71 Has an Identity |
| R1-R4 | The Four 48-Bit Accumulator Registers 71-74 |
| S1-Sn | The "n" 48 Bit Number Storage Registers 83-85 |
| BFI | Buffer Register 58 Has an Identity |
| EOF | Exponent Overflow |
| SOF | Digit 9 Has an Overflow |
| ROF | Digit 10 Has an Overflow |
| SAE | Signs Are Equal |
| BFS | Digit 9 of Buffer 58 Is Non-Zero |
| PRC | Print Complete Flip-Flop that Is Set when the Print Buffer Operation Is Complete |

In FIG. 1 the solid lines generally designate digital data signal paths, the dashed lines generally designate paths of control signals provided by the subcommand and control unit 54, and the dashed-dotted lines generally designate paths of other control signals. A single data line in the drawings sometimes represents a number of physical lines so that the drawings can best illustrate the invention. Corresponding elements are generally identified by the same reference symbols throughout the drawings.

Referring again to FIG. 1, pressing a key also sets a flip-flop in the keyboard history storage and strobes unit 12 by conditioning an appropriate one of the labeled input lines identifying the contents of control and digit register 15 as a decimal number, a control code, or a social operation such as a decimal point, an exponent or a clear code. The timing clock system 13 then inserts a 40 millisecond delay prior to starting the cycle counters 51 and the shifting of the various registers. This delay allows the switch bounce and power drive to the memory to stabilize. Depending upon the state of the keyboard history storage and strobes unit 12 transmitted over the lines 52 and the state of the control and digit register 15 sensed over the lines 53, the cycle counters 51 sequence from one state to another through a predetermined sequence. Each operation of number storage, shifting, printing and arithmetic execution is therefore performed under the direct and/or indirect control of the cycle counters 51, the control and digit register 15, the keyboard history storage and strobes unit 12, the timing clock system 13 and the decoded logical derivative of the subcommand and control unit 54 which receives signals from the timing clock system 13 over line 55 and from the cycle counters 51 over lines 56 and delivers appropriate signals to the cycle counters 51 over lines 57. If the contents of control and digit register 15 comprise a decimal digit, the signal on the NUMBER input line to keyboard history storage and strobes unit 12 causes the analyzer to sequence through a set of cycles that result in the contents of the buffer register 58 being shifted one character left and the digit in the control and digit register 15 being shifted into the buffer register 58 over line 61.

The actual data storage registers may be conventional magnetic core or flip-flop registers. Control and digit register 15 is preferably a 4-bit register arranged to receive data in parallel from keyboard system 11 and in series from control storage register 77 while providing stored data in series on lines 61 and 76. Any of numerous well-known techniques may be employed for converting the depression of a key into a 4-bit coded electrical signal that is transferred on four parallel lines to control and digit register 15.

The control storage register 77 preferably comprises a 96-bit serial register capable of storing twenty-four 4-bit codes representative of a program to be automatically carried out by the analyzer when operating in the automatic computing mode. The remaining registers are preferably 48-bit serial registers capable of storing nine 4-bit decimal digits, two 4-bit decimal digits identifying an exponent, a 2-bit operation code, a sign bit and a normally unused bit which may accept an overflow bit.

Figure 3:
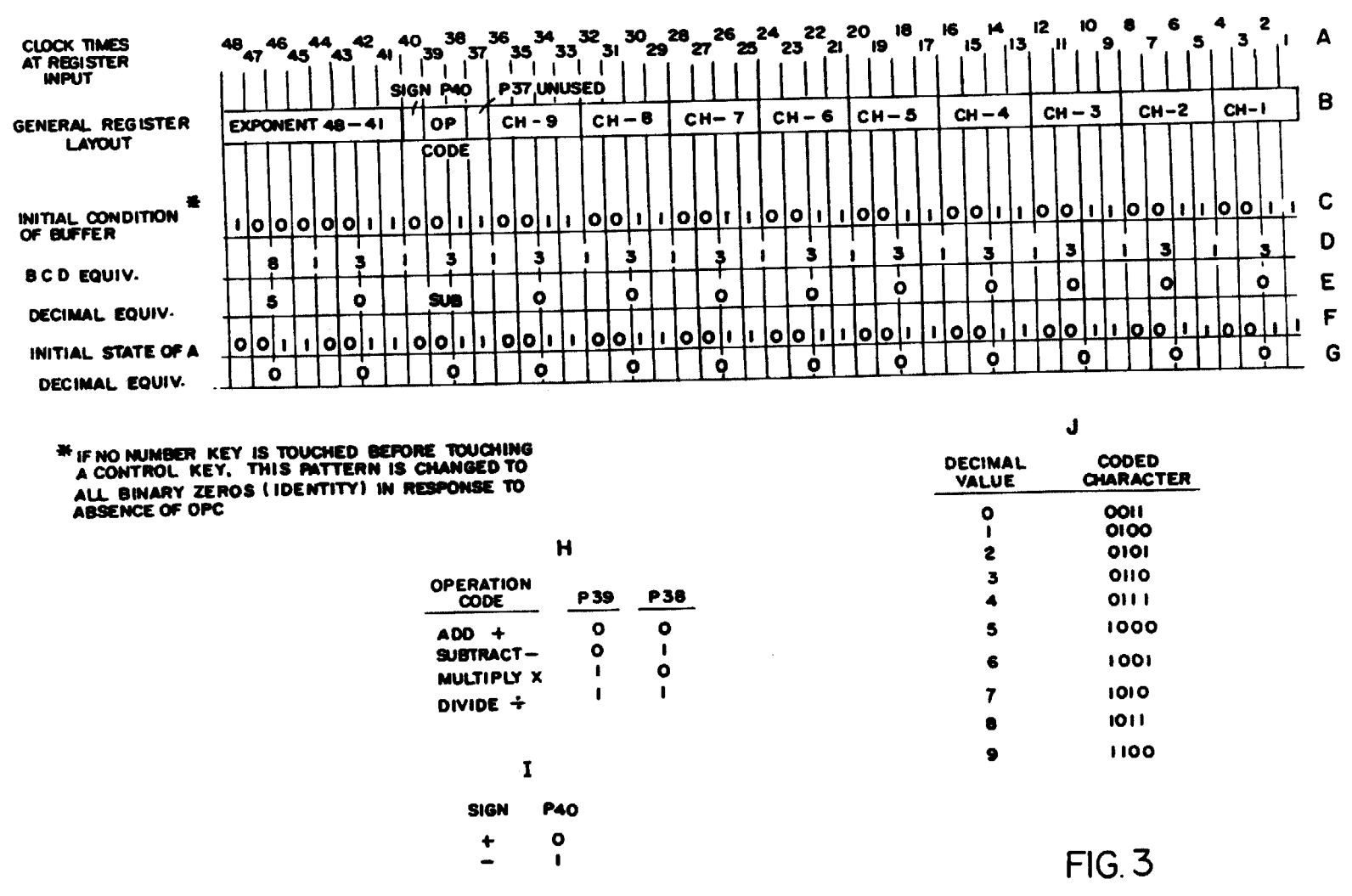

Referring to FIG. 3, there is shown in FIG. 3B a diagram illustrating the general register layout of the 48-bit registers in relation to the clock times (shown in FIG. 3A) when data immediately below the designated clock times may be extracted. Stated in other words, the cascaded 48 bistable stages in a general register will store the data characters represented in FIG. 3B in respective numbered bistable stages at the clock times immediately above in FIG. 3A. Thus, the first 36 bistable stages or cells then store nine characters each represented by a 4-bit binary code. The 37th stage or cell is normally unused. The 38th and 39th stages or cells contain one of the operation codes corresponding to add, subtract, multiply or divide as set forth in FIG. 3H. The 40th stage or cell then contains the sign bit as indicated in FIG. 3I, and the remaining eight stages or cells store the exponent, which may be two decimal digits each encoded by a 4-bit binary code as shown in FIG. 3J, the well-known excess 3 code.

FIG. 3C shows the initial condition of the 48 bistable stages of buffer or B register 58 (in the excess 3 code) at clock time 1; FIG. 3D shows the binary coded decimal equivalent; and FIG. 3E shows the decimal equivalent.

FIG. 3F shows the initial state of the auxiliary or A register 62; and FIG. 3G shows the decimal equivalent then stored at clock time 1 in each four-stage group.

It will thus be recognized that in the illustrated specific embodiment the word format comprises a decimal number which may include nine decimal digits, an operation code, and a multiplier comprising 10 raised to a positive or negative power extending over a range of 100. This selection of word format leads to the ability of the analyzer to solve a wide variety of numerical problems with precision and speed while employing relatively little apparatus.

The foregoing explanation of the word format should be helpful in understanding the further discussion of FIG. 1. If the contents of the control and digit register 15 comprise the contents of a decimal digit or C, the system is caused to sequence through a set of cycles resulting in the buffer register 58 being shifted one digit left and the character in the control and digit register 15 being inserted in the CH-1 position of buffer register 58. If a decimal point code has been selected by depressing key 23 (FIG. 2), then a decimal one is subtracted from the stored buffer register exponent in stages 41-48 for each subsequent decimal digit keyed into the register. Appropriate control signals channel a number identified as an exponent following depression of key 24 (FIG. 2) into the exponent position of the auxiliary register 62. Upon the next operation on that number the auxiliary and buffer register exponents are added if the decimal point key was not depressed. If the decimal point key was depressed, the A exponent is subtracted from the B exponent.

The buffer register 58 performs the dual function of both input and output register, collecting and storing numbers entered either from the keyboard system 11 through the control and digit register 15 or from the storage registers 63 through the storage register selection network 64. Also, output results to be printed are transmitted over line 60 for editing and printing by printer 16. Even though buffer register 58 is used in the intermediate execution and transfer of data, it always ends up in an initial state as shown in FIGS. 3C–E storing a 50 in the exponent position and coded zeros in all the number positions. The buffer register 58 and the auxiliary register 62 never carry an operation code, but may use that space for a tenth digit. Only the accumulator registers 71–74 carry meaningful operation codes.

The auxiliary register 62 serves to hold an exponent that may have been entered from the keyboard system 11 and receives that exponent from control and digit register 15. This stored exponent may be transferred over line 66 to adder 67 for execution of multiplication and division or to an auxiliary manipulative register in computing sums and differences, the result of a computation typically being returned to auxiliary register 62.

A number of accumulator registers 71–74 designated R1–R4 not only function as accumulators in connection with automatically computing and storing arithmetic data as entered, but comprise a portion of the means for effecting parenthecation. The input accumulator 71 functions to hold a partial result and an operation code designating the mathematical operation. The partial result is transferred to buffer register 58 over line 75. The operation code bits are received from control and digit register 15 over line 76 and indicate the operation that must be performed on that partial result. It has been discovered that by utilizing multiple accumulator registers 71–74, the physical placement of a quantity within a specific one of the accumulator registers can be used to designate the grouping operators and to obviate the need for specifically encoding the left and right parentheses. Thus with but two accumulator registers 71 and 72, an unlimited number of beginning left parentheses and all necessary right parentheses may be manipulated. By adding an extra pair of accumulator registers for each additional left parenthesis that is entered into the analyzer and that is immediately preceded by entry of a number, any number of left parentheses may be entered prior to closing with a right parenthesis. Thus, by adding the extra pair of accumulator registers 73 and 74 shown in the exemplary embodiment of FIG. 1, the analyzer can accept entry of an additional left parenthesis within a problem before closing with a right parenthesis.

The normal operation of the analyzer involves the arithmetic combination of the partial result in input accumulator register 71 with the contents of buffer register 58 under control of the operation code stored in cells 38 and 39 (FIG. 3) of the input accumulator register 71 followed by entry of the result of this combination in input accumulator register 71 with a control code provided by control and digit register 15 for performing the next step in the program. Also, data is exchanged among the four accumulator registers 71–74 and buffer register 58 in accordance with the steps set forth in chart 1 of FIG. 4. If applicable, further arithmetic operations are performed on the new pairs of numbers so shifted by combining the contents of the buffer register 58 with the contents of the input accumulator register 71 under control of the operation code then stored in stages 38 and 39 of the input accumulator register as before. The actual arithmetic operation performed is always performed under control of the operation code then stored in accumulator register 71, and the shifting of the accumulator register and the operation code assigned to the resultant combination is under control of the control code then in control and digit register 15 as selected by the keyboard system 11.

If the program mode switch 22 (FIG. 2) of the keyboard system 11 is in the LEARN position, then control signals applied to control and digit register 15 cause the contents of control storage register 77, a cascaded succession of stages with each stage arranged to receive four bits in series, to shift one character position left and the stage of control storage register 77 vacated by the left shift to receive over line 61 the four bits then in control and digit register 15. The control storage register 77 as embodied in one version of the present invention is a standard 96-bit shift register capable of holding 24 control codes received from control and digit register 15. Control storage register 77 receives control and register selection codes from control and digit register 15 during the LEARN mode. It receives a STOP code upon selection of a numeric and then an operator. The operator is then entered after the STOP code. The significance of the STOP code is discussed below.

Moving program mode switch 22 of the keyboard system 11 to the LEARN position not only sets up the control state causing coded signals to enter control storage register 77 from control and digit register 15, but also causes a CLEAR signal to momentarily clear the entire control storage register 77 so that it stores all zeros, thereby eliminating any previous stored program. Therefore, when the program mode switch 22 is moved from the LEARN position to any of the other positions, a coded character will then be in storage in the control storage register 77 for each control key or numeric key of the keyboard system 11 that was actuated while the program mode switch 22 was in the LEARN position. A blank character (all binary zeros) will reside in any of the 24 character positions of control storage register 77 then not filled. If the AUTO key 36 is then depressed, the contents of control storage register 77 will control the operation of the analyzer in a manner identical to the keyboard manual control previously described except that numbers and operation codes will be entered into control and digit register 15 over line 81 instead of over lines 14.

If the program mode switch 22 is in the NORMAL, BRANCH or STOP positions and square root key 34 is depressed, the program for taking the square root of a number by the method of successive approximations is inserted in control storage register 77 for accepting a number to be square rooted in storage register 1 (S1) and an estimated answer in storage register 3 (S3), where the correct answer eventually resides.

Control storage register 77 will automatically shift left in four bit steps past all blank characters to the first non-zero coded character stored therein. This stops the shifting of the control storage register 77, and the coded character is extracted and put into control and digit register 15 to cause the analyzer to operate in the same manner as if the coded character had been entered from the keyboard manually. When that operation is complete, control and digit register 15 transmits the coded character over line 61 back to control storage register 77 for restorage, causing control storage register 77 to shift to the next coded character which will be transferred over line 81 into control and digit register 15 for the next operation.

If a STOP code appears in the position of the character transferred over line 81, the automatic operation is halted and manual insertion of a number from the keyboard is required before the AUTO key 36 may again be depressed to resume automatic operation. However, numbers can be inserted into buffer register 58 from the numbered storage registers 63 rather than from the keyboard system 11 so that automatic operation need not be halted when a number is required in a sequence. The control code calling that number from a storage register 63 may be selected under control of the control and digit register 15. Computed results can also be stored in the numbered storage registers 63, and these computed results may be automatically selected for future computations.

By depressing the EQUALS STORE key 41 instead of the EQUALS key 31, a computed result will be stored in one of the storage registers 63 designated by a corresponding numeric key, provided that numeric key is depressed after depressing the EQUALS STORE key 41. Upon depressing the numeric key identifying a specific one of the storage registers 63, the code of that numeric key is stored in control and digit register 15, and the contents of the buffer register then containing the result to be stored are transferred to the designated one of the storage registers 63 under control of the storage register selection network 64. The old contents of the designated storage register are cleared, leaving all other storage registers undisturbed. The utility of this mode of operation is especially advantageous in iterative computations for rapidly evaluating elements in a series with a minimum of apparatus.

If it is desired to select the contents of a designated one of the storage registers 63 under the control of keyboard system 11, then the STORE key 37 is depressed to set up control states in the cycle counters 51 to condition the analyzer to recognize the next numeric key depressed as identifying exactly which storage register is to be selected. This numeric key then starts the control sequencing to cause the contents of the selected one of the storage registers 63 to be transferred to the buffer register 58, leaving the contents of the selected storage register unchanged. At this point, buffer register 58 contains the same number as the selected register, exactly as if that number had been keyed in digit by digit from the keyboard system 11. By first depressing the PRINT key 42 and then one of the numeric keys, the contents of a storage register identified by the numeric key are first transferred to the buffer register 58 and then printed by printer 16 in the same manner as an item is printed upon entry into the buffer register during normal operation.

Any of the three number storage manipulation keys 37, 41 and 42, each coupled with a following numeric identifier key, can cause an appropriate control code to be stored in control and digit register 15 for transfer to control storage register 77 when program mode switch 22 is in the LEARN position. These codes are then cyclically recalled later while operating in the AUTOMATIC mode so that iterative computation involving extracting numbers from selected storage registers and putting results into selected storage registers can be performed without manual intervention.

If the program mode switch 22 is in the NORMAL position, depressing AUTO key 36 causes control storage register 77 to shift, select a code, transfer it to control and digit register 15 where it is operated upon, and repeat the cycle indefinitely if neither a STOP code nor an EQUALS code has been inserted. Automatic operation will always halt for numbers in response to a STOP code or after a computed printed result. If it comes to blank codes at the end of the progress, control storage register 77 will continue to shift and repeat the steps in the process. By moving program mode switch 22 to the STOP position, automatic operation will stop on each blank code.

By moving the program mode switch 22 to the BRANCH position, automatic operation will stop on the first blank code transferred over line 81, if, and only if, the result of the last arithmetic operation was either zero or positive. The control storage register 77 will shift past the blank codes and repeat the steps in the stored process if the result of the last computation before the blank code was negative. Therefore, the stop is conditional upon the last computed result.

Figure 5:
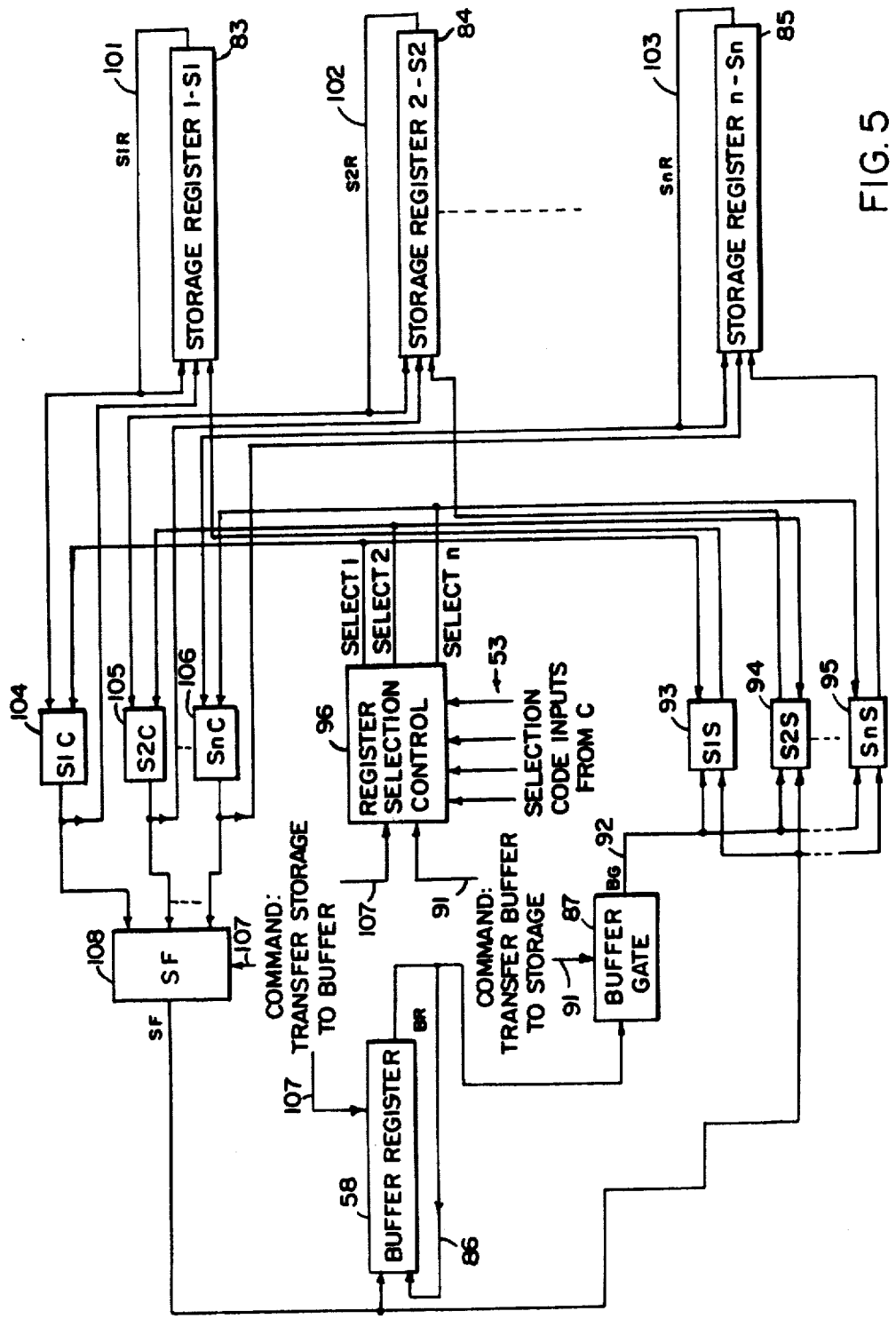
FIG. 5 is a block diagram illustrating the logical arrangement of a storage register selection system.

Referring to FIG. 5, there is shown a block diagram illustrating the logical arrangement of the apparatus for selecting the different storage registers. If it is desired to transfer the contents of the buffer register 58 to one of the several storage registers 83—85, the buffer recirculation line 86 is gated through buffer gate 87, when input line 91 of the buffer gate 87 is conditioned by the command signal TRANSFER BUFFER TO STORAGE, to provide on the BG output line 92 the same digital data carried by the buffer recirculation line 86. The BG output line 92 carries this data to a plurality of storage register selection gates 93-95 designated S1S-SnS, respectively, each associated with a respective one of the storage registers 83-85. This data is gated through one of these register selection gates 93-95, when the register selection control 96 decodes the register number indicated by the selection code input lines 53, in response to the command signal TRANSFER BUFFER TO STORAGE being applied to input line 91 of the register selection control 96 to energize a respective one of the SELECT lines and thereby condition a corresponding one of the selection gates 93-95. The conditioned one of the selection gates 93-95 then transmits the digital data in serial form on BG output line 92 to the input of the selected one of the storage registers 83-85.

As indicated above, the storage registers are preferably recirculating registers whereby data ejected at the output is normally reinserted at the input of each register via the various recirculation lines S1R–SnR. When new data is to be stored, means are provided for inhibiting the reinsertion function. To accomplish this each of the storage register recirculation lines 101–103 of storage registers 83–85, respectively, is also coupled to an input line of a respective output control gate 104–106, respectively designated S1C–SnC. When the other input line of one of these control gates 104–106 is conditioned by a SELECT signal provided by register selection control 96, the output line of the control gate thus enabled provides the complement of the signal being recirculated on the corresponding recirculation line for reinsertion into the selected storage register. This complementary signal is fed back and gated with the signal on the corresponding recirculation line into the selected storage register to provide a logical combination for reinsertion that is then always zero, thereby effectively inhibiting recirculation during the write-in time of the selected storage register.

The provision of a TRANSFER STORAGE TO BUFFER command signal on input line 107 of register selection control 96 initiates the transfer of data from the selected storage register, which is indicated by activation of one of the SELECT lines from register selection control 96 to condition a selected one of the storage gates 93–95 and a selected one of the control gates 104–106. Application of the TRANSFER STORAGE TO BUFFER command signal to input line 107 of the select function gating means 108 enables that means to transmit the digital data transmitted by the enabled one of control gates 104–106 for insertion into buffer register 58 over the SF output line and also through the enabled one of selection gates 93–95 into the same storage register then selected. As a result, recirculation occurs through the enabled one of control gates 104–106, select function gating means 108 and the enabled one of selection gates 93–95 to preserve a nondestructive readout, even in the presence of the complementary combination of the output of an enabled one of control gates 104–106 with the signal on a respective one of recirculating lines 101–103. By employing the register selection system of FIG. 5 with identical register selection controls for input and output transfers, reliable operation is obtained with relatively few components to further aid in keeping system costs down.

Figure 6:
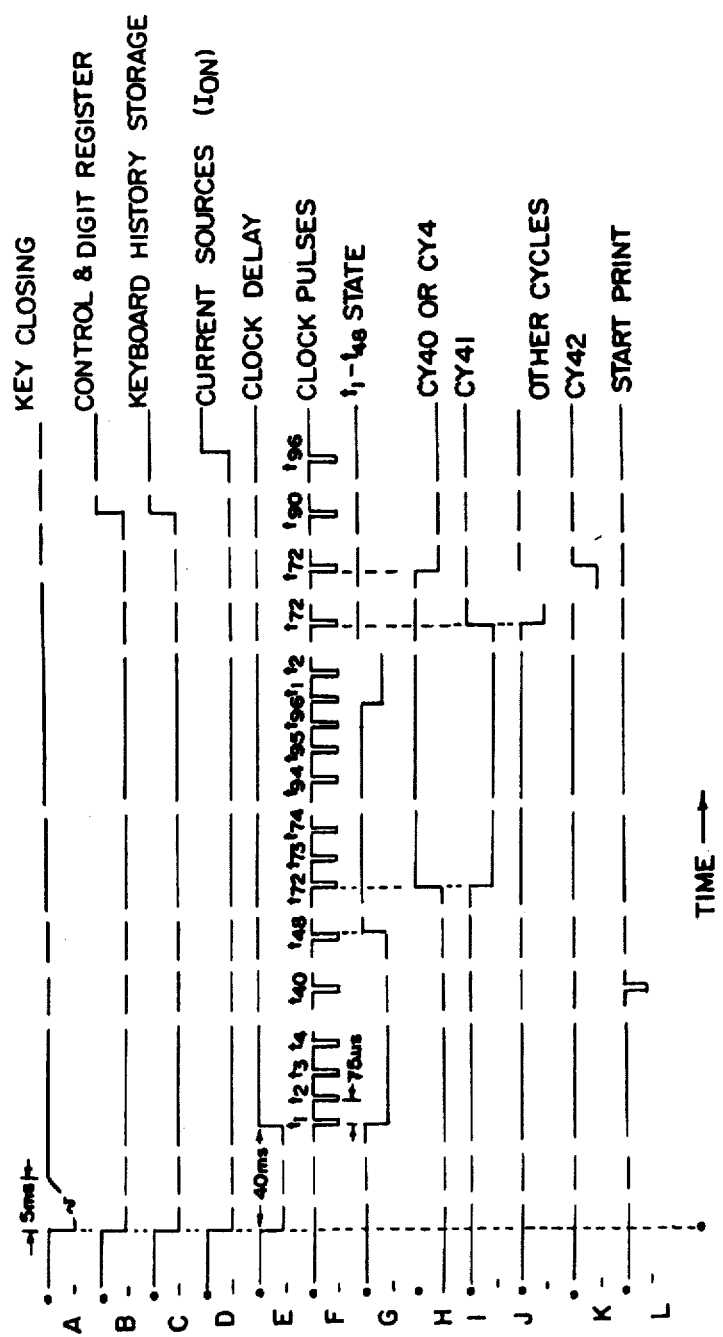
FIG. 6 illustrates the timing relationship among different control signals.

Referring to FIG. 6, there is shown a timing diagram for general overall operation of an exemplary embodiment of the invention in which waveforms are represented on a common time scale that has been compressed where breaks are indicated. The start of an operating cycle typically commences with the depression of a key on the keyboard or an equivalent operation initiated through external means or through the internal program during the course of automatic operation. It is therefore convenient to consider time zero as the time when a key is depressed. Depressing a key typically discharges a capacitor that has previously been charged to −5 volts, the discharge taking place in about five milliseconds as illustrated in FIG. 6A. This voltage pulse causes the setting of those flip-flops in control and digit register 15 required to encode the depressed key, the set signal in FIG. 6B showing the waveform of a typical flip-flop thus set. An appropriate flip-flop in keyboard history storage and strobes unit 12 as designated by an activatd one of the six labeled input lines may then also be set as represented by the signal waveform of FIG. 6C. Energization of one of these input lines causes the operating power to change from standby and operate with the presence of the ION signal shown in FIG. 6D. The key closing pulse of FIG. 6A is effective to set the various flip-flops that provide the signals shown in FIGS. 6B–6D. The ION signal of FIG. 6D also starts the START CLOCK DELAY signal shown in FIG. 6E for introducing a forty millisecond delay, the START CLOCK DELAY signal typically being provided by a monostable multivibrator that remains in the unstable state for forty milliseconds after being triggered by the ION signal.

The forty millisecond delay provided by the timing clock system 13 allows the key closure and the power to stabilize before the clock pulses shown in FIG. 6F begin. At the end of this forty millisecond delay, the timing clock system 13 provides the clock pulses on line 55 for controlling the sequencing of the analyzer. These clock pulses are counted down, subdivided and otherwise processed to make available many logical derivatives. By using a 48-count signal which changes state every 48 clock pulse periods as shown in FIG. 6C, the identity of each clock pulse from time t1 to time t96 can be uniquely defined. The 48 clock pulses occurring while a t1–t48 flip-flop output is negative as shown in FIG. 6B are called t1–t48, respectively, and the 48 clock pulses occurring while the t1–t48 flip-flop output is at ground potential as also shown in FIG. 6G are called t49–t96, respectively. As indicated above, all the serial shift registers within the analyzer are 48 bits long and are synchronized with the timing clock pulses. Bit 1 of a 48-bit word reenters a register input at time t1, and the other numbered bits enter a register at a bit time identified by a corresponding number. Therefore, a serial register for word storage cycles twice in 96 clock pulse periods so that there are two word cycles for each clock cycle. The individual clock pulses are effectively counted through logical decoding techniques by cycle counters 51, each counter cycle being abbreviated as CY followed by an appropriate numeric as indicated in FIGS. 6H–K. As will become clearer from the discussion below, the occurrence of a specific counter cycle state effects the carrying out of a specific function of the analyzer. In the preferred embodiment of this invention there are 28 counter cycles.

A cycle counter state is active for 96 clock pulse periods, and all changes in cycle counter states occur at time t72. Counter cycle CY40 is employed to define the normal standby state for the analyzer, and the designating flip-flop produces a negative potention (on) while no operation is occurring. Since the timing clock starts at time t1, and the cycle counters change state at time t72, CY40 is on for the first 72 clock pulse periods of the timing clock, at which time CY41 usually comes on.

Figure 7:
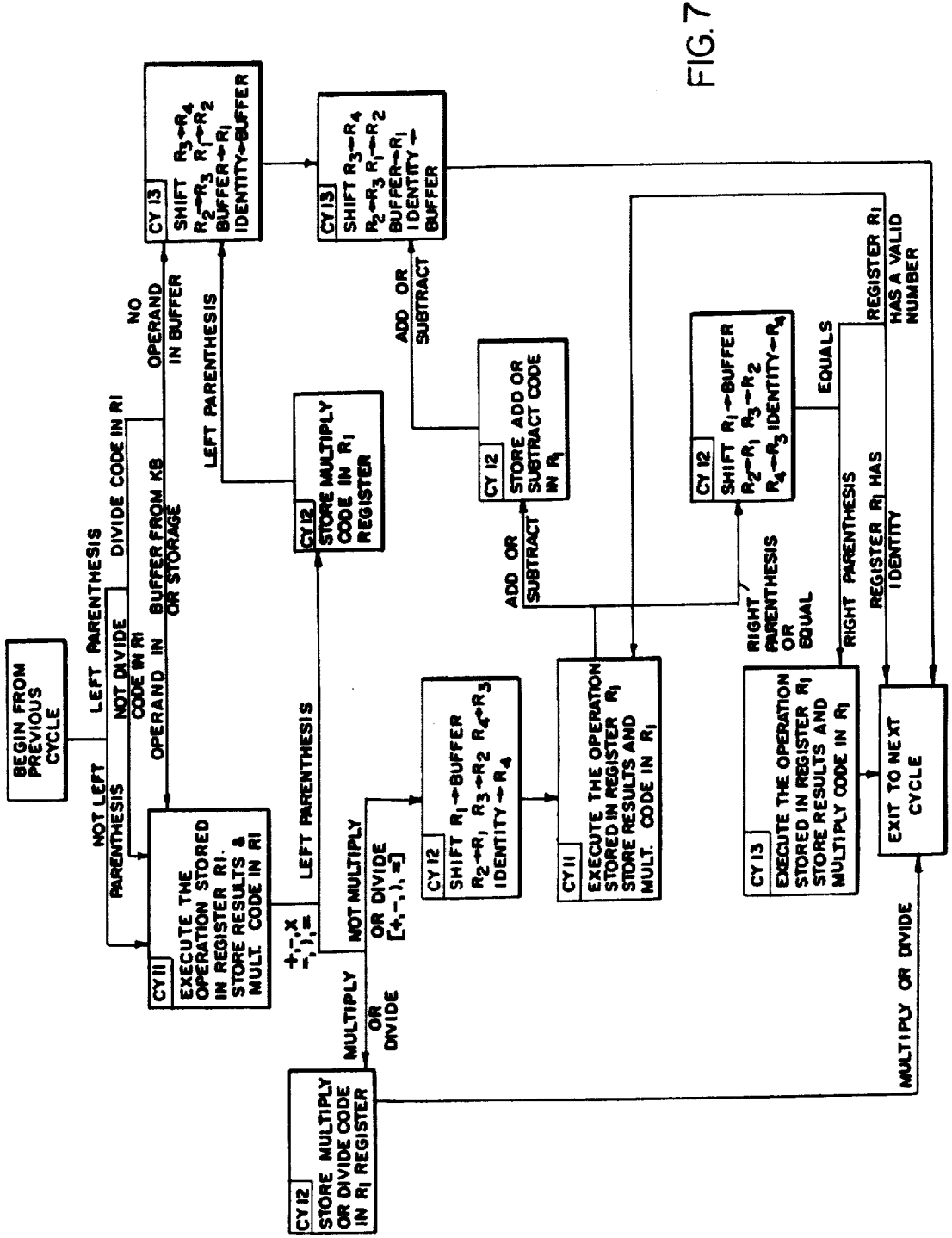
FIG. 7 is a flow diagram helpful in understanding the logical functions implemented by the invention.

Referring to FIG. 7, there is shown a block diagram illustrating the logical sequence of steps performed by the analyzer in executing partial result computation in compliance with the associative and commutative laws. The box at the top of the diagram indicates the beginning of the sequence from the preceding operating cycle, and the box at the bottom indicates the exit to the next operating cycle. Conditional occurrences are indicated by the branches with the flow following the branch labeled with the then existing condition. The number in the upper left hand corner of the blocks identifies the counter cycle in which the steps designated therein are carried out by the analyzer. The logical sequence represented in FIG. 7 occurs each time an add, subtract, multiply, divide, left parenthesis, right parenthesis or equal function is selected through the keyboard system 11 or automatically.

FIG. 7 shows the logical paths that can be followed for each operation, including when shifting should occur and when another operation should be performed. The control flow through the counter cycles is a function of the control code then stored in control and digit register 15, but the actual arithmetic operation performed on the contents of the buffer register 58 and the R1 accumulator register 71 is under control of the operation code stored in the R1 register 71. The exceptions to the control flow being solely determined by the control code stored in control and digit register 15 are (1) when a left parenthesis operator follows a divide operator and no number was entered between these successive operators, or (2) when cycling between counter cycles CY11 and CY12 with an EQUALS code in the control and digit register 15 and with a valid (non-identity) number in the R1 accumulator register 71 (cycling continues until an identity is shifted into the R1 accumulator register).

FIG. 4 shows that only four operation codes, add, subtract, multiply and divide, are stored in the R1 register 71 (left and right parentheses are always accompanied by a stored multiply code). Furthermore, only a one-bit operation code to distinguish between an add or subtract or between a multiply or divide need be stored because the initial placement of data within the R accumulator registers 71–74 determines if the stored operation code is add/subtract or multiply/divide. Upon completion of the operating cycle resulting from the entry of any of the four operation codes, add, subtract, multiply, or divide, from the keyboard system 11, the add or subtract operation code is located in the R2 register 72 and the multiply or divide operation code is located in the R1 register 71. Since all operating cycles always result in net shifts among the R registers 71–74 of an even amount, the R1 and R3 registers 71 and 73 always contain either a multiply operation code, a divide operation code or an identity, and the R2 and R4 registers 72 and 74 always contain either an add operation code, subtract operation code or an identity. However, in the preferred embodiment described herein, a two-bit code is used to store the add, subtract, multiply of divide operation codes to introduce a relatively inexpensive redundancy that minimizes the chance of an erratic operation.

In FIG. 4, chart 1 sets forth the steps carried out by the analyzer in executing keyboard commands, and chart 2 shows the R1 and buffer register contents before and after each arithmetic operation. Chart 1 shows a summary of the steps through which the analyzer is sequenced in response to selection of each of the keyboard control key functions. This is basically a restatement in tabular form of the flow diagram shown in FIG. 7. Chart 2 shows the R1 register 71 contents and the buffer register 58 contents both before and after execution of each arithmetic operation. The manner in which the contents of these two registers are arithmetically combined in serial form to result in add, subtract, multiply and divide in cooperation with adder 67 is well-known in the art and not specifically described herein so as not to obscure the principles of the present invention.

To further illustrate how the numeric value of a function is analyzed using the techniques described herein, consider evaluating the following equation:

$$2+(3)+(4-5\times 6)7=.$$

The following tabulation lists in the left hand column the order of keys depressed and then sets forth in the right hand column what happens in the analyzer following the depression of each key.

| KEY | ACTION |
|---|---|
| 2 | a 2 is put in Buffer Register 58. |
| + | (1) The 2 in the Buffer and an Identity initially in R1 combine to create a 2 that is stored in R1. |
|  | (2) R1 is shifted to the Buffer, leaving the 2 in the Buffer and an Identity from R2 is transferred to R1. |
|  | (3) The Buffer and R1 are again combined, leaving a 2 in R1 and an Identity in the Buffer. |
|  | (4) A + code is attached to R1. |
|  | (5) The 2+ in R1 is transferred to R2, the Identity in the Buffer is transferred to R1, and an Identity is Left in the Buffer. |
| ( | (1) The Identities in both R1 and the Buffer combine to leave an Identity in both R1 and the Buffer)i.e., no useful result has transpired). |
|  | (2) a X code is attached to the Identity in R1. |
|  | (3) The 2+ in R2 is shifted to R3, and the Identities in R1 and the Buffer are shifted to R2 and R1, respectively, leaving an Identity in the Buffer. |
|  | (4) The 2+ in R3 is shifted to R4, and the Identities in the Buffer, R1 and R2 are shifted to R1, R2 and R3, respectively, leaving an Identity in the Buffer. |
| 3 | a 3 is put in the Buffer |
| ) | (1) The 3 in the Buffer is combined with the Identity in R1, and a X code is put in R1 leaving 3X in R1 and an Identity in the Buffer. |
|  | (2) The 2+ in R4 is shifted to R3, an Identity is put in R4, the 3 in R1 is shifted to the Buffer, and Identities are left in R1 and R2 and an X code is left in R1. |
|  | (3) The 3 in the Buffer and the X code and the Identity in R1 are arithmetically combined, leaving a 3X in R1 and an Identity in the Buffer. |
|  | (4) The 2+ in R3 is shifted to R2, and the 3X in R1 is shifted to the Buffer, leaving Identities in R4, R3 and R1. |

-continued

| KEY | ACTION |
|---|---|
| | (5) The Identity in R1 is combined with the 3X in the Buffer, leaving 3X in R1 and an Identity in the Buffer. |
| | (1) The Identity in the Buffer is combined with the 3X in R1, leaving 3X in R1 and an Identity in the Buffer. |
| | (2) A ÷ code is put in R1, leaving 3÷ in R1. |
| ( | (1) The 2+ in R2 is shifted to R3, the 3÷ in R1 is shifted to R2, and Identities are left in the Buffer, R1 and R4. |
| | (2) The 2+ in R3 is shifted to R4, and the 3÷ in R2 is shifted to R3, leaving Identities in the Buffer, R1 and R2. |
| 4 | A 4 is put in the Buffer. |
| − | (1) The 4 in the Buffer is combined with the Identity in R1 leaving a 4 in R1. |
| | (2) The 4 in R1 is shifted to the Buffer, the 2+ in R4 is shifted to R3, the 3÷ in R3 is shifted to R2, and Identities are left in R4 and R1. |
| | (3) The 4 in the Buffer is combined with the Identity in R1, leaving a 4 in R1 and an Identity in the Buffer. |
| | (4) A − code is attached to the 4 in R1, leaving 4− in R1. |
| | (5) The 2+ in R3 is shifted to R4, the 3÷ in R2 is shifted to R3, the 4− in R1 is shifted to R2, leaving Identities in R1 and the Buffer. |
| 5 | A 5 is put in the Buffer. |
| X | (1) The 5 in the Buffer is combined with the Identity in R1, leaving a 5 in R1 and an Identity in the Buffer. |
| | (2) A X code is attached to the 5 in R1, leaving 5X in R1. |
| 6 | A 6 is put in the Buffer. |
| | RECAP: 6 in Buffer, 5X in R1, 4− in R2, 3÷ in R3 and 2+ in R1. |
| ) | (1) The 5X in R1 and the 6 in the Buffer are multiplied, leaving 30 in R1 and an Identity in the Buffer. |
| | (2) The 30 in R1 is shifted to the Buffer is shifted the 4− in R2 to R1, the 3÷ in R3 is shifted to R2, the 2+ in R4 is shifted to R3, and an Identity is left in R4. |
| | (3) The 4− in R1 is combined with the 30 in the Buffer, leaving −26 in R1 and an Identity in the Buffer. |
| | (4) The −26 in R1 is shifted to the Buffer the 3÷ in R2 is shifted to R1 the 2+ in R3 is shifted and Identies are left in R3 and R4. |
| | (5) The 3÷ in R1 is combined with the −26 in the Buffer. leaving −.115384615X in R1 and a X code is put in R1 Identity in the Buffer. |
| 7 | A 7 is put in the Buffer. |
| = | (1) The −.115384615X in R1 is combined with the 7 in the Buffer leaving −.80769231 stored in R1 and an Identity in the Buffer. |
| | (2) The −.80769231 in R1 is shifted to the Buffer, the 2+ in R2 is shifted to R1, and R2, R3 and R4 are left with Identities. |
| | (3) The 2+ in R1 is combined with the −.80769231 in the Buffer, leaving 1.19230769 stored in R1 and an Identity in the Buffer. |
| | (4) The 1.19230769 in R1 is shifted to the Buffer, and the Identities in R2, are R3 and R4 shifted to R1, R2 and R3, respectively. |
| | (5) Since R1 is and identity, the process is ended, and the contents of the Buffer are printed. |

The printed format appears as:

$$2+(3) \div (4-5 \times 6)7 = 1.19230769.$$

The contents of the accumulation registers R1-R4 and the Buffer register B at the end of each step are set forth in the following table.

ously described above. Each counter cycle of 96 clock pulse periods is indicated in FIG. 8 as a block with a number in the upper left corner identifying the counter cycle CY with an appended number. The remainder of each box contains an abbreviated description of the steps which occur for each counter cycle with an accompanying encircled number designating those sub-

| KEY→ | 2 | + | (3) | ÷ | (4 | − | 5 | × | 6) | 7 | = |
|---|---|---|---|---|---|---|---|---|---|---|---|---|---|---|
| R4 | I | I | I | 2+ | 2+ | I | I | 2+ | 2+ | 2+ | 2+ | 2+ | 2+ | I | I | I |
| R3 | I | I | I | 1X | 1X | I | I | 3÷ | 3÷ | 3÷ | 3÷ | 3÷ | 3÷ | I | I | I |
| R2 | I | I | 2+ | I | I | 2+ | 2+ | I | I | 4− | 4− | 4− | 4− | 2+ | 2+ | 1+ |
| R1 | I | I | I | I | I | 3X | 3÷ | I | I | I | I | 5X | 5X | X | X | I |
| B | I | 2 | I | I | 3 | I | I | I | 4 | I | 5 | I | 6 | I | 7 | N |

NOTES:
I = Identity
M = 3 ÷ (4 − 5 × 6) = −.115384615
N = 1.19231769

Referring to FIG. 8, there is illustrated the flow diagram for each operation helpful in understanding in detail how the cycle counters control the overall operation of the analyzer. Each key depressed on the keyboard (FIG. 2) starts a sequence of operations as previously command signals provided by subcommand and control signal source 54 (FIG. 1) during that counter cycle and defined in the following SUBCOMMAND SIGNAL LIST. FIG. 1 shows the physical relationship of the control signal sources that activate the subcommand signals (i.e., cycle counters 51, timing clock 13, etc.) supplied to the devices that are controlled (i.e., the registers, printer, etc.), and FIG. 8 shows the sequential timing of the activation of these signals.

As represented in FIG. 6H of the timing diagram counter cycle CY40 is the normal standby cycle, but counter cycle CY4 becomes the standby cycle for identifying register numbers. The counter cycle relations are shown more clearly and in greater detail in FIG. 8. At the end of a process, the analyzer usually assumes counter cycle CY40 at time t72, and during the interval t73-t96 of counter cycle CY40, the control and digit register 15 and other special control lines are cleared to prepare them for receiving the next sequence of data resulting from depressing the next key of the keyboard system 11. As shown in FIG. 6L of the timing diagram, a PRINT cycle is often inserted into a normal cycle flow, such as during counter cycle CY40. When this occurs, the START PRINT signal begins at time t40 with the timing gap between times t40 and t41 being long enough to allow the printing to then occur. Therefore, the print operation establishes a time interval between clock pulses t40 and t41 that is much longer than the normal time interval between clock pulses.

SUBCOMMAND SIGNAL LIST

1. Shift the contents of the buffer B digit positions D1–D9 one digit position to the left (i.e., the contents of D9 to D10, of D8 to D9, ... of D1 to D2), and put a decimal zero in D1.
2. Transfer the exponent portion of the buffer B to adder input 1 (AI-1).
3. Transfer the C register contents to the lowest order digit position of the buffer B (i.e., the D1 position).
4. Shift the contents of the buffer B, including exponent, end-around.
5. Stop the timing clock and reset the C register, digit key flip-flop (KND), and control key flip-flop (KC).
6. Transfer the output of the adder or process logic (PLO) into the exponent positions of the buffer B. Leave the remainder of the buffer B unchanged.
7. Complement the exponent in the adder using input 2 (AI-2).
8. Set the contents of the digit position D10 in the buffer B to 5 (multiply roundoff).
9. Generate +5 in the D1 digit position of the adder using input 1 (AI-1).
10. Shift data in the R accumulator registers "down" (i.e., the contents of R3 to R4, of R2 to R3, and of R1 to R2). Also, put the identity configuration "I" in R1.
11. Shift data in the R accumulator registers "up" (i.e., the contents of R1 to B, of R2 to R1, of R3 to R2, and of R4 to R3). Put an identity in R4.
12. Add plus one to the contents of digit position D1 in the adder.
13. Generate all nines (999999999) in the D1–D9 digit positions of the adder using input 2 (AI-2).
14. Generate 50 in the exponent positions of the adder using input 2 (AI-2).
15. Add plus one to the exponent in the adder.
16. Add 99 to the exponent in the adder using input 2 (AI-2).
17. Generate 09 in the exponent positions of the adder using inpug 2 (AI-2).
18. Shift the contents of the buffer B digit positions one digit position to the right (i.e., the contents of D2 to D1, of D3 to D2, ... of D10 to D9). Leave a space code (i.e., 0000) in digit position D10.
19. Complement the exponent and the digits in digit positions D1–D10 of the adder using input 2 (AI-2).
20. Transfer the exponent portion of accumulator register R1 to the adder using input 2 (AI-2).
21. Transfer the contents of the buffer B digits positions D1–D10 to the adder using input 1 (AI-1).
22. Transfer the contents of the digit positions D1–D9 of the accumulator register R1 to the adder using input 2 (AI-2).
23. Transfer the adder output (PLO) to the buffer B digit positions D1–D10.
24. Transfer the contents of the digit positions D1–D9 of the adder to the accumulator register R1.
25. Transfer the buffer sign to the sign position of R1.
26. Transfer the exponent portion of the adder output (PLO) to R1.
27. Transfer the contents of the digit positions D1–D10 of the auxiliary register A to the adder using input 2 (AI-2).
28. Transfer the contents of R1 to B and of B to R1 so as to exchange their original contents.
29. Put a "zero" in digit position D10 of buffer B.
30. Shift the contents of R1 one digit position to the right (i.e., the contents of D2 to D1, ... of D9 to D8). Also put the contents of the D1 digit position of the buffer B into the D9 digit position of R1 and the contents of the D1 digit position of R1 into the exponent position of R1.
31. Shift the contents of R1 one digit position to the left (i.e., the contents of D1 to D2, ... of D8 to D9). Also, shift the lowest order exponent position to D1 of R1.
32. Generate 99 in the exponent positions of the adder using input 1 (AI-1).
33. Set the contents of each of the digit positions D1–D10 of the buffer B to zero, and set the buffer sign to +.
34. Complement the buffer sign if OP1 is subtract.
35. Complement the buffer sign if the sign of R1 is negative.
36. Set the buffer sign flip-flop (BS) from the output of the selection function (SF).
37. Shift the digit in the exponent position of the A register left one digit position.
38. Store an "add" code in R1.
39. Store a "subtract" code in R1.
40. Store a "multiply" code in R1.
41. Store a "divide" code in R1.
42. Print an "S" character.
43. If the automatic mode flip-flop (ANS) is set or the program mode is LEARN (LM), shift the contents of control storage register CS one position and then write the contents of the C register into the vacated position of the control storage register.
44. Shift the control storage register CS one position, then write a STOP code in the vacated position.
45. If the automatic flip-flop (ANS) is set, then set the C register from the control storage register CS.
46. Write "blank" into all digit positions of the control storage register CS.
47. Print an "=" character.
48. Transfer the buffer B to the C register.
49. Transfer the C register to the buffer B.
50. Reset the C register.
51. Print a "+" character.
52. Print a "−" character.
53. Print a "X" character.

54. Set the code that corresponds to the key depressed into the C register.
55. Print a "÷" character.
56. Print a "." character.
57. Print a " " character.
58. Print a "(" character.
59. Set the A register to zeros in all digit positions.
60. Shift the decimal point in the buffer B right one digit position.
61. If a decimal code exists, shift all digits to the left of it, up to an including the digit in digit position D10, one digit position to the right. Then change all space codes to zeros.
62. Set the contents of the highest order buffer digit position D10 to the space code, 0000.
63. Print a ")" character.
64. Put an identity code in the buffer B.
65. Start the timing clock.
66. Edit and print the contents of the buffer B.
67. Print the 10th digit in the buffer B.
68. Print a blank (space the printer).
69. Transfer the adder output (all positions) into the A register.
70. Transfer the exponent positions of the A register to adder input 2 (AI-2).
71. Set the decimal point code in the most significant digit position of the buffer B.
72. Print the code in the C register as a number.
73. Reset the EE flip-flop.
74. Reset the DPS flip-flop.
75. Reset the OPC flip-flop.
76. Set the OPC flip-flop.
77. Set the EE flip-flop.
78. Set the DPS flip-flop.

Referring specifically to FIG. 8J, there is shown the sequence of controls for carrying out a typical command of ADD. Upon depressing the ADD key 25 (FIG. 2), the four-bit code for ADD enters control and digit register 15 over lines 14 and the keyboard control key flip-flop (KC) is set in keyboard history storage and strobes unit 12 to identify the contents of control and digit register 15 as a control code rather than a number. Since counter cycle CY40 is the standby state prior to touching the ADD key 25, CY40 is on during this time and, as explained above in connection with describing the timing diagram of FIG. 6, remains on for the first 72 clock pulse periods after the clock starts. In the box designating CY40 in FIG. 8J for add or subract, the notation KEYBOARD TO C1-C4 indicates the main control function occurring during this cycle. Also, the two encircled numbers 54 and 65 refer to subcommands 54 and 65, respectively, and indicate that these subcommands are effected in counter cycle CY40. From the SUBCOMMAND SIGNAL LIST, subcommand 54 commands "set the code that corresponds to the key depressed into the C register", and subcommand 65 commands "start the timing clock". The arrow pointing from the counter cycle CY40 box to the counter cycle CY41 box indicates that at clock pulse t72 counter cycle CY40 ends and counter cycle CY41 begins. This state causes an identity to be transferred to the buffer register 58 if the operand created state flip-flop (OPC) in the keyboard history storage and strobes unit 12 is off (i.e., not set). The OPC flip-flop is set if any numeric key or register selection occurred just prior to depressing the ADD key 25 which caused the sequence of steps now under consideration. Also, a second occurrence indicated in the counter cycle CY41 box is shown as BX±AX→BX meaning, "the exponent of auxiliary register A is either added to or subtracted from the exponent of buffer register B and the result is transferred to buffer register B". By referring to the definitions of subcommands listed in the counter cycle CY41 box, it can be seen that the decision as to whether AX is added or subtracted depends upon whether a decimal point state flip-flop (DPS) is set or not. The DPS flip-flop is set whenever decimal point key 23 is touched in number entry, and this DPS flip-flop remains set until the next control code, such as this ADD control code now being considered. If the DPS flip-flop is set, this indicates that the exponent count stored in auxiliary register A should be considered as a negative exponent and therefore subtracted from the buffer register B exponent. If the DPS flip-flop is in the reset or off state, the exponent count stored in auxiliary register A is to be considered positive and added to that in buffer register B. If, during number entry, neither a decimal point was entered by depressing key 23 nor an exponent entered by depressing key 24 to set an exponent entered flip-flop (EE), then the exponent stored in auxiliary register A is zero and the result of this step yields no net change in the buffer register B exponent. The subcommands dealing with this operation are: (1) subcommand 2 "transfer the exponent portion of the buffer B to adder input 1 (AI-1)"; (2) subcommand 6 "transfer the output of the adder or process logic (PLO) into the exponent positions of the buffer B and "leave the remainder of the buffer B unchanged"; (3) subcommand 70 "transfer the exponent positions of the A register to adder input 2 (AI-2)"; and under control of the DPS flip-flop subcommand 7 "complement the exponent in the adder using input 2 (AI-2)" and (5) subcommand 15 "add plus one to the exponent in the adder". As is evident to those skilled in the computer art the latter two operations under control of the DPS flip-flop result in a subtraction taking place rather than an add.

Continuing the detailed description of FIG. 8J, upon completion of counter cycle CY41 there follows counter cycle CY1 where no subcommand is executed for the add or subract operation. The notation "pass" within the box indicates that after 96 clock pulse periods, the control state simply passes on to the next counter cycle CY2 with no data changes taking place.

In counter cycle CY2 the various subcommands again control the actions outlined within the box in the same manner as that described in the previous counter cycles. Counter cycle CY2 primarily serves to enter a new control code into the control and digit register 15 if operation is in the automatic mode, in which case counter cycle CY2 would have been entered from the last counter cycle prior to normally entering counter cycle CY42 or CY3 for the previous command as indicated in FIG. 8O. In the case of the add or subtract operation being considered, control would go from the last counter cycle CY13 performed to counter cycle CY2 to get the next command if operation is in the automatic mode, where commands come from the control storage register 77 rather than from the keyboard system 11.

The control then passes from counter cycle CY2 to counter cycle CY11 where the arithmetic operations take place. The exact sequencing of the arithmetic operations is under control of the cycle counter signals that step the arithmetic operation of add, substract, multiply and divide through all commands required for their execution. Counter cycle CY11 is active throughout this entire operation which can take as few as two counter cycles of 96 clock pulse periods each or as many as 125 counter cycles. (The details of this process are illustrated in FIG. 9 showing the sequencing of counter cycles CY20–CY28 and CY31–CY34. The rectangular boxes represent the numbered counter cycles designated in the upper left hand corner of each box. Logical decision branching points are represented by the boxes formed by a circular arc and chord. Lines leading from the arc indicate the process flow when the condition in the box is true. Lines leading from the chord indicate process flow when that condition is false. Since those skilled in the computer art will readily recognize how the arithmetic operations take place from the flow shown therein, further discussion thereof is not included herein.) Counter cycles CY11, CY12, CY11, Cy12, and CY13 are executed in that sequence exactly as explained in more detail previously with respect to FIG. 7, which illustrates the processing of the arithmetic operations. The last counter cycle CY13 passes control to counter cycle CY3 where a plus or minus sign as stored in the control and digit register 15 is printed. At the completion of counter cycle CY3, control passes to counter cycle CY42, where the contents of the buffer register 58 and the states in keyboard history storage 25 and strobes unit 12 are returned to normal, and then back to counter cycle CY40, where the control and digit register 15 is cleared in preparation for the next key stroke and the timing clock is turned off.

Referring to FIG. 8B, there is shown the sequence of steps responsive to depressing the CLEAR single digit key 44. With specific reference to counter cycle CY1 the command is then given to "edit and print the contents of the buffer B". This command signal causes a separate set of cycle counters 51 to sequence control through a set of "edit" cycles and thence to "print" cycles while counter cycle CY1 remains on. The EDIT cycles are shown in FIG. 10 and consist of counter cycles CY51–CY54. By following the flow from counter cycle CY51 (which is the first EDIT cycle to come on during counter cycle CY1) up to counter cycle CY54 (where the actual printing of the contents of the buffer register 58 is performed), it can be seen that the buffer register 58 is shifted so that (1) a decimal point code is inserted into the proper number sequence, (2) the exponent is corrected to the proper digit to be printed, and (3) blanks are inseted in the word where no output digits are to be printed. During counter cycle CY54, the highest order character in the buffer register 58 is printed, and then the buffer contents of the register 58 are shifted to print the next highest order character in the buffer register. Counter cycle CY54 continues until the entire contents of the buffer register 58 have been shifted and printed in this manner. At the completion of the PRINT counter cycle CY54, counter cycle CY51 is again entered where the decimal point and blanks are removed from the buffer register 58. leaving it in a restored state, and control then passes from counter cycle CY1 to counter cycle CY40 where operation halts.

Figure 11:
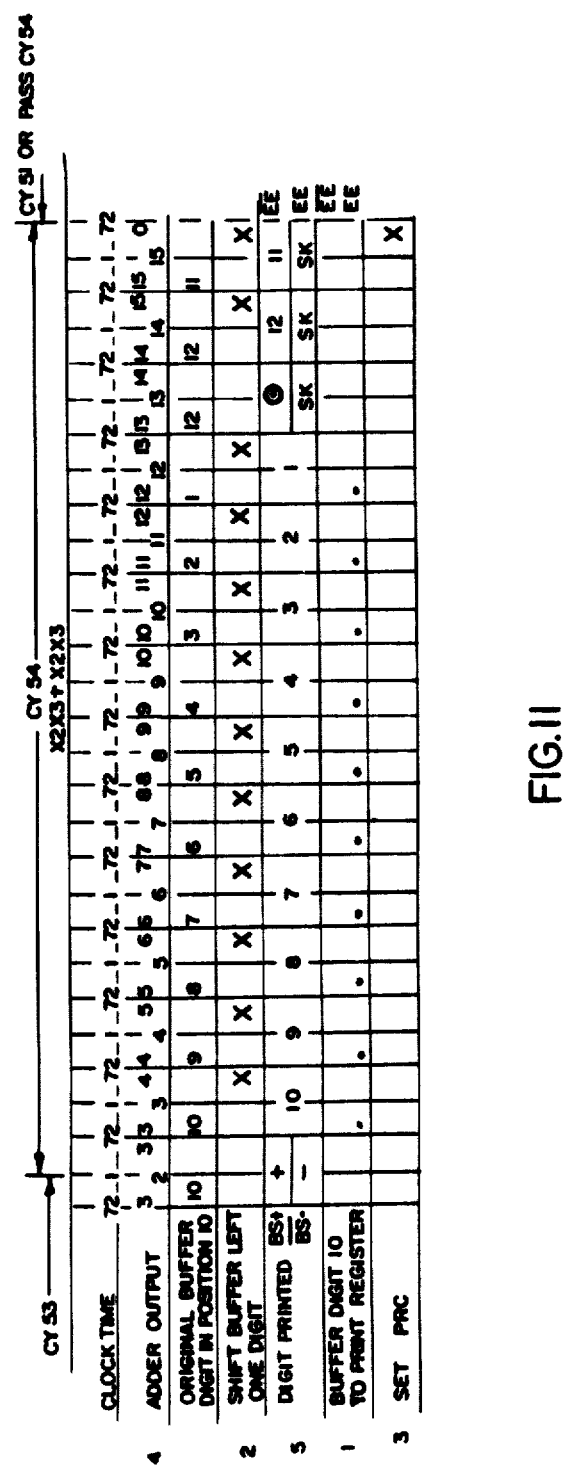

FIG. 11 is a timing diagram illustrating the occurrence of events during the EDIT and PRINT cycles. As explained above, actual print out occurs at clock time t72. The adder output provides a count signal that is representative of which event in the counter cycle is then occurring. The digits in the buffer register 58 are sequentially shifted to the buffer register digit position D10 and printed out from that position. The occurrence of a shift left is indicated by an "X". The digits are printed in the order of decreasing significance preceded by the sign and followed by the "eyeball" symbol and two more digits designating a power of ten multiplier if required. The transfer of a digit then in the buffer register digit position D10 occurs at a time indicated by ".". The setting of the PRC (print complete) flip-flop occurs when printing is complete at the time designated by the lowermost "X".

There has been described novel apparatus and techniques for function analyzing capable of being practiced with very little training by those having no specific computer knowledge. The invention efficiently employs the apparatus to keep the number of components down and thereby enhance reliability and reduce costs. It is apparent that those skilled in the art may now make numerous modifications of an departures from the specific apparatus and techniques described herein without departing from the inventive concepts. Consequently, the invention is to be construed as limited solely by the spirit and scope of the appended claims.

The embodiments of the invention in which an exclusive property or privilege is claimed are defined as follows:

1. A calculator for processing digital operand signals, comprising:
   keyboard input means including a first set of keys for entering digital operand signals to be processed and further including a second set of keys for entering digital operator signals determining the manner in which the digital operand signals are to be processed;
   buffer storage register means, coupled to the keyboard input means, for temporarily storing digital operand signals entered by the keyboard input means;
   a plurality of data storage registers, coupled to the buffer storage register means, for storing digital operand signals transferred thereto from the buffer storage register means;
   processing means, coupled to the keyboard input means, the buffer storage register means and the data storage registers, for processing entered digital operand signals in accordance with entered digital operator signals, said processing means including first means for selectively transferring an entered digital operand signal between the buffer storage register means and one of the data storage registers in response to a digital operator signal entered by operation of a sequence of keys including one of the first set and one of the second set and designating one of the data storage registers, said processing means further including second means for selectively combining entered digital operand signals in accordance with other digital operator signals entered by selected keys of the second set to provide resultant digital signals; and
   output means, coupled to the buffer storage register means and the processing means, for providing an output indication of the resultant digital signals.

2. A calculator as in claim 1 wherein said first means is responsive to a digital operator signal entered by operation of a sequence of keys including a first operator key followed by a numeric key of the first set for transferring an entered digital operand signal from the buffer storage register means to a selected one of the data storage registers designated by that numeric key.

3. A calculator as in claim 2 wherein said first means is also responsive to another digital operator signal entered by operation of a sequence of keys including a second operator key of the second set followed by a numeric key of the first set for transferring an entered digital operand signal from a selected one of the data storage registers designated by that numeric key to the buffer storage register means.

4. A calculator as in claim 1 wherein said first means is responsive to a digital operator signal entered by operation of a first sequence of keys, including one of the first set and one of the second set and designating one of the data storage registers, for transferring an entered digital operand signal from the buffer storage register means to one of the data storage registers.

5. A calculator as in claim 4 wherein said first means is responsive to a digital operator signal entered by operation of a second sequence of keys, including one of the first set and one of the second set and designating one of the data storage registers, for transferring an entered digital operand signal from one of the data storage registers to the buffer storage register means.

6. A calculator as in claim 5 wherein said first sequence of keys includes a numeric key of the first set and an operator key of the second set.

7. A calculator as in claim 5 or 6 wherein said second sequence of keys includes a numeric key of the first set and an operator key of the second set.

* * * * *